United States Patent
Kim

(10) Patent No.: US 10,443,291 B2
(45) Date of Patent: Oct. 15, 2019

(54) VEHICLE DOOR CONTROL APPARATUS AND VEHICLE

(71) Applicant: LG ELECTRONICS INC., Seoul (KR)

(72) Inventor: Jonghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 15/463,007

(22) Filed: Mar. 20, 2017

(65) Prior Publication Data

US 2017/0268280 A1    Sep. 21, 2017

(30) Foreign Application Priority Data

Mar. 18, 2016 (KR) .................. 10-2016-0032885

(51) Int. Cl.
| | |
|---|---|
| *E05F 15/73* | (2015.01) |
| *B60T 7/22* | (2006.01) |
| *B60R 13/00* | (2006.01) |
| *B60J 5/10* | (2006.01) |
| *B60W 30/06* | (2006.01) |
| *B60W 30/08* | (2012.01) |
| *E05F 15/70* | (2015.01) |
| *G01S 15/93* | (2006.01) |

(Continued)

(52) U.S. Cl.
CPC .............. *E05F 15/73* (2015.01); *B60J 5/10* (2013.01); *B60R 13/005* (2013.01); *B60T 7/22* (2013.01); *B60W 30/06* (2013.01); *B60W 30/08* (2013.01); *E05F 15/70* (2015.01); *B60Y 2300/085* (2013.01); *B60Y 2400/301* (2013.01); *E05F 2015/763* (2015.01); *E05F 2015/767* (2015.01); *E05Y 2900/531* (2013.01); *E05Y 2900/546* (2013.01); *G01S 13/931* (2013.01); *G01S 15/931* (2013.01); *G01S 17/936* (2013.01); *G01S 2013/9364* (2013.01); *G01S 2013/9367* (2013.01)

(58) Field of Classification Search
None
See application file for complete search history.

(56) References Cited

U.S. PATENT DOCUMENTS

| | | | | |
|---|---|---|---|---|
| 8,111,146 | B2 * | 2/2012 | Touge | B60Q 9/00 340/436 |
| 2009/0243826 | A1 * | 10/2009 | Touge | B60Q 9/00 340/436 |

(Continued)

FOREIGN PATENT DOCUMENTS

| | | |
|---|---|---|
| CN | 101180552 A | 5/2008 |
| DE | 102011017240 | 12/2011 |

(Continued)

OTHER PUBLICATIONS

Extended European Search Report in European Application No. 17161298.9, dated Aug. 17, 2017, 9 pages (with English translation).

*Primary Examiner* — Thomas G Black
*Assistant Examiner* — Demetra R Smith-Stewart
(74) *Attorney, Agent, or Firm* — Fish & Richardson P.C.

(57) ABSTRACT

A vehicle door control apparatus includes a sensor provided on a door of a vehicle. The vehicle door control apparatus also includes a processor configured to control opening or closing of the door based on information regarding an object sensed through the sensor.

23 Claims, 31 Drawing Sheets

(51) Int. Cl.
    *G01S 17/93* (2006.01)
    *G01S 13/93* (2006.01)

(56) References Cited

U.S. PATENT DOCUMENTS

| | | | |
|---|---|---|---|
| 2011/0043325 A1* | 2/2011 | Newman | E05F 15/73 340/5.2 |
| 2014/0207344 A1 | 7/2014 | Ihlenburg et al. | |
| 2017/0210282 A1* | 7/2017 | Rodriguez Barros | G03B 21/00 |

FOREIGN PATENT DOCUMENTS

| | | |
|---|---|---|
| DE | 102014209227 | 11/2015 |
| DE | 102014213270 | 1/2016 |
| EP | 0479735 | 4/1992 |
| FR | 2764091 | 12/1998 |
| JP | 2012207382 | 10/2012 |
| JP | 2014531534 | 11/2014 |
| JP | 2015533960 | 11/2015 |
| KR | 20040055003 A | 6/2004 |
| KR | 20130019625 A | 2/2013 |
| WO | 2006122870 | 11/2006 |
| WO | 2015113554 | 8/2015 |

\* cited by examiner

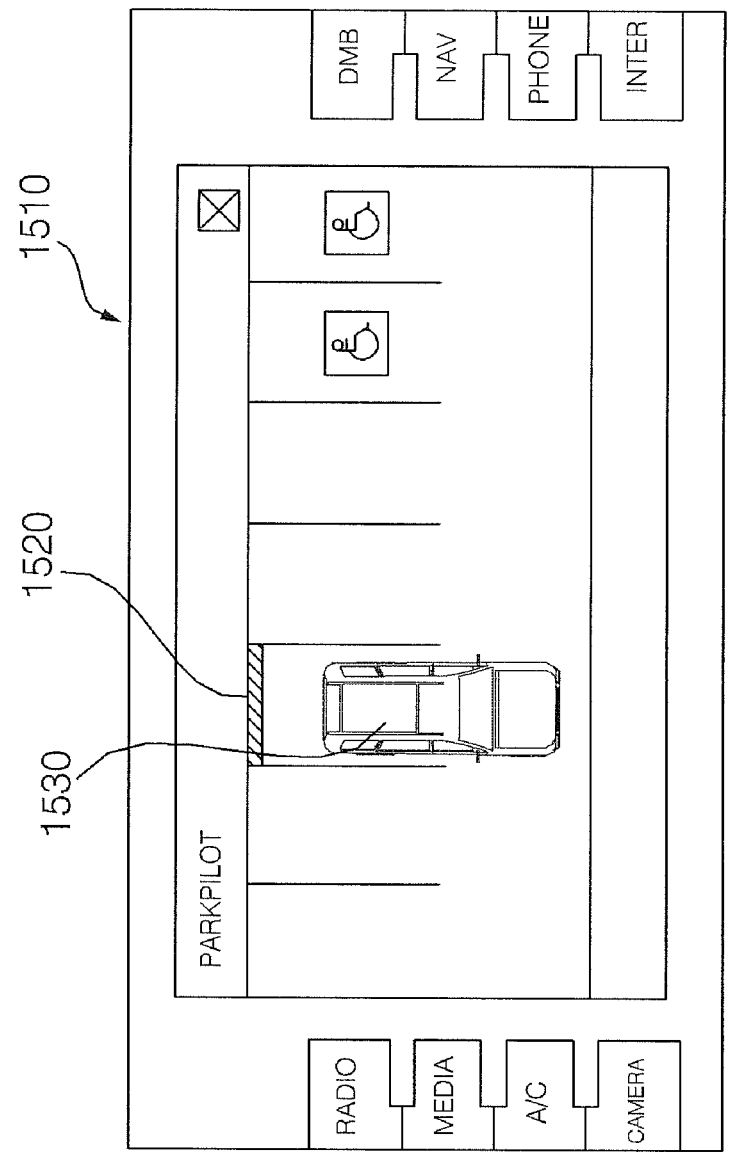

VEHICLE DOOR CONTROL APPARATUS AND VEHICLE

CROSS-REFERENCE TO RELATED APPLICATIONS

This application claims the benefit of an earlier filing date and right of priority to Korean Patent Application No. 10-2016-0032885, filed on Mar. 18, 2016 in the Korean Intellectual Property Office, the disclosure of which is incorporated herein by reference.

TECHNICAL FIELD

The present disclosure relates to a vehicle door control apparatus and a vehicle.

BACKGROUND

A vehicle is an apparatus that allows a user who rides therein to drive the apparatus in a desired direction. A representative example of the vehicle may be an automobile.

Vehicles are typically equipped with various sensors and electronic devices designed to improve convenience of the user who uses the vehicle. For example, various sensors and devices for improving driving convenience have been developed.

SUMMARY

Systems and techniques are disclosed that provide a vehicle door control apparatus configured to control an opening or a closing of a door of the vehicle according to information that is sensed regarding the surroundings of the vehicle.

In one aspect, a vehicle door control apparatus includes a sensor provided on a door of a vehicle; and a processor configured to control opening or closing of the door based on information regarding an object sensed through the sensor.

In some implementations, the door is a tailgate, the sensor is covered by an emblem formed in one area of the tailgate, and the processor is configured to control motion of the emblem such that, based on an occurrence of a first event, the processor controls a movement of the emblem to expose the sensor.

In some implementations, the emblem is configured to rotate about a horizontal axis or a vertical axis, and the processor is configured to control a rotation of the emblem about the horizontal axis or about the vertical axis based on the occurrence of the first event.

In some implementations, the first event is an input signal reception event for opening the door that is received through an input unit that is provided near the emblem.

In some implementations, the sensor is an ultrasonic sensor or a camera.

In some implementations, the camera includes an around view monitoring (AVM) apparatus, a blind spot detection (BSD) apparatus, or a rear camera apparatus provided in the vehicle.

In some implementations, the processor is configured to: detect a distance between the door and the object; and control opening or closing of the door based on the distance detected between the door and the object.

In some implementations, the processor is configured to: based on the distance between the door and the object being within a threshold distance, control opening of the door such that the door and the object do not come into contact.

In some implementations, the processor is configured to: based on the distance between the door and the object being within a threshold distance, provide a signal for controlling the door not to be opened despite an occurrence of a first event.

In some implementations, the processor is configured to: based on the door being opened, stop the opening of the door based on the object sensed through the sensor being located within an opening trajectory of the door.

In some implementations, the sensor is configured to sense objects within a sensing range, and the sensing range of the sensor is adapted in correspondence with a motion of the door of the vehicle.

In some implementations, the vehicle door control apparatus further includes: an interface configured to communicate with a power source drive unit that is configured to control a power source provided in the vehicle. The door may be a tailgate, and the processor may be further configured to: based on the object sensed by the sensor being located within an opening trajectory of the tailgate, provide a signal, to the power source drive unit, for moving the vehicle in a forward direction.

In some implementations, the processor may be configured to provide the signal to the power source drive unit for moving the vehicle in the forward direction by a distance such that the object sensed by the sensor is outside of the opening trajectory of the tailgate.

In some implementations, the processor may further be configured to control an opening of the tailgate while the vehicle moves in the forward direction.

In some implementations, the interface may be configured to communicate with a brake drive unit that is configured to control a brake apparatus provided in the vehicle. The processor may be further configured to: receive, through the interface, information regarding a forward object located in front of the vehicle, and provide a signal, to the brake drive unit, for stopping the vehicle based on the forward object being located on a movement route of the vehicle moving in the forward direction.

In some implementations, the processor may further be configured to: based on a second event occurring in a state of opening the tailgate, control closing of the tailgate, and provide a signal for moving the vehicle in a backwards direction such that a backward movement of the vehicle is in correspondence with a closing speed of the tailgate.

In some implementations, the processor may be further configured to: based on receiving, through the interface, information regarding a rear object located behind the vehicle, control the tailgate to close with a first closing speed that is greater than a second closing speed with which the tailgate is closed based on the information regarding the rear object not being received.

In some implementations, the interface may be configured to communicate with a brake drive unit for controlling a brake apparatus provided in the vehicle. The processor may be configured to: detect a distance between the vehicle and the object; and provide a signal, to the brake drive unit, for stopping the vehicle based on the distance being within a threshold distance.

In some implementations, the processor may be configured to, based on closing the door, stop the closing of the door based on the object being located within a closing trajectory of the door.

In some implementations, the door may be a tailgate, the sensor may be rotatably formed, and the processor may be configured to control a rotation of the sensor based on an occurrence of an event.

In some implementations, the vehicle door control apparatus may further include an interface configured to communicate with a vehicle display apparatus. The processor may be configured to provide data to display, on the vehicle display apparatus, a stop area in which the door is able to be opened or closed based on the information regarding the object.

In some implementations, the vehicle door control apparatus may further include an interface configured to communicate with a brake drive unit that is configured to control a brake apparatus provided in the vehicle. The processor may be configured to provide a signal to the brake drive unit to stop the vehicle in a stop area in which the door is able to be opened or closed based on the object information.

In some implementations, the door may be a side door, and the processor may be configured to control opening of the door within a range in which the side door and the object do not come into contact.

In another aspect, a vehicle may include a vehicle door control apparatus according to one or more implementations described above.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions. Details of the other implementations are included in the detailed description and drawings. Other features will be apparent from the description and drawings, and from the claims. The description and specific examples below are given by way of illustration only, and various changes and modifications will be apparent.

BRIEF DESCRIPTION OF THE DRAWINGS

FIG. 15 is a diagram illustrating an example operation of a vehicle display apparatus based on object information received in a vehicle door control apparatus.

DETAILED DESCRIPTION

Figure 1A:
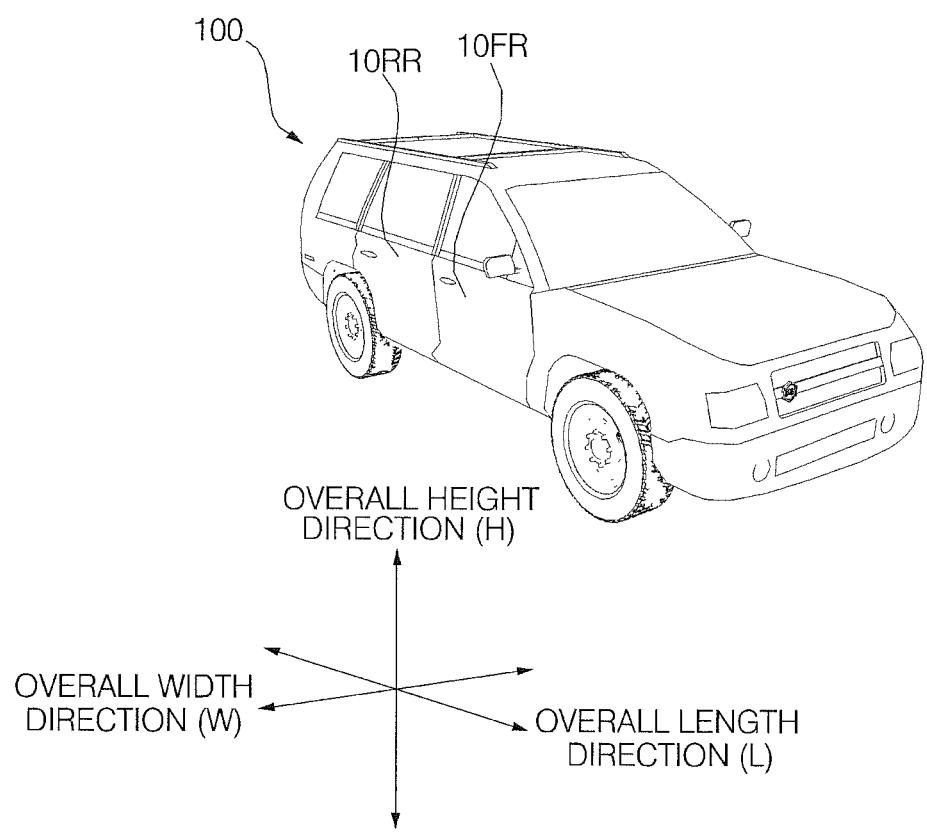
FIGS. 1A to 1D are diagrams illustrating examples of an outer appearance of a vehicle.

A vehicle may have automatic doors that are designed to automatically open and/or close. However, if objects are located near the automatic door, the vehicle may be damaged when the door is automatically opened. In addition, if a person stands or moves near the automatic door, the person may be injured when the door is automatically opened.

As an example, vehicles such as SUVs, hatchbacks, or wagons may implement a rear-facing door, such as a tailgate, that may come into contact with a person, a structure, or another vehicle when the tailgate is opened or closed.

Accordingly, there may be a problem caused by contact or collision with automatically controlled vehicle doors.

Systems and techniques are disclosed herein that provide a vehicle door control apparatus configured to control opening or closing of a vehicle door according to sensed object information. The vehicle door control apparatus includes a sensor provided on a door of the vehicle and a processor that controls opening or closing of the door based on information of an object sensed through the sensor.

A vehicle as described in this specification may include an automobile and a motorcycle. Hereinafter, an automobile will be focused upon.

A vehicle as described in this specification may include all of an internal combustion engine vehicle including an internal combustion engine as a power source, a hybrid vehicle including both an internal combustion engine and an electric motor as a power source, and an electric vehicle including an electric motor as a power source.

In the following description, the left of a vehicle means the left of the vehicle in the direction of travel and the right of the vehicle means the right of the vehicle in the direction of travel.

FIGS. 1A to 1D are block diagrams of a vehicle according to one implementation.

Referring to FIGS. 1A to 1D, the vehicle 100 may include wheels rotated by a power source and a steering input device for controlling the direction of travel of the vehicle 100.

In some implementations, the vehicle 100 may be an autonomous vehicle. The autonomous vehicle may be switched to an autonomous traveling mode or a manual mode according to user input. When the autonomous vehicle is switched to the manual mode, the autonomous vehicle 100 may receive steering input via the steering input device.

The vehicle 100 may include one or more doors 10FR, 10FL, 10RR, 10RL and 20. The doors 10FR, 10FL, 10RR, 10RL and 20 divide internal and external spaces of the vehicle 100 and are automatically or manually opened or closed. The doors may include side doors 10FR, 10FL, 10RR and 10RL opened or closed when a user gets into the vehicle, a trunk, a tailgate 20 and a hood.

The vehicle 100 may include a vehicle door control apparatus 200. In some implementations, the vehicle door control apparatus 200 may be an around view monitoring (AVM) apparatus.

An overall length refers to a length from the front part to the rear part of the vehicle 100, an overall width refers to the width of the vehicle 100, and an overall height refers to the length from the lower part of a wheel to a roof. In the following description, the overall length direction L may refer to a reference direction for measuring the overall length of the vehicle 100, an overall width direction W may refer to a reference direction for measuring the overall width of the vehicle 100, and an overall height direction H may refer to a reference direction for measuring the overall height of the vehicle 100.

Figure 1B:
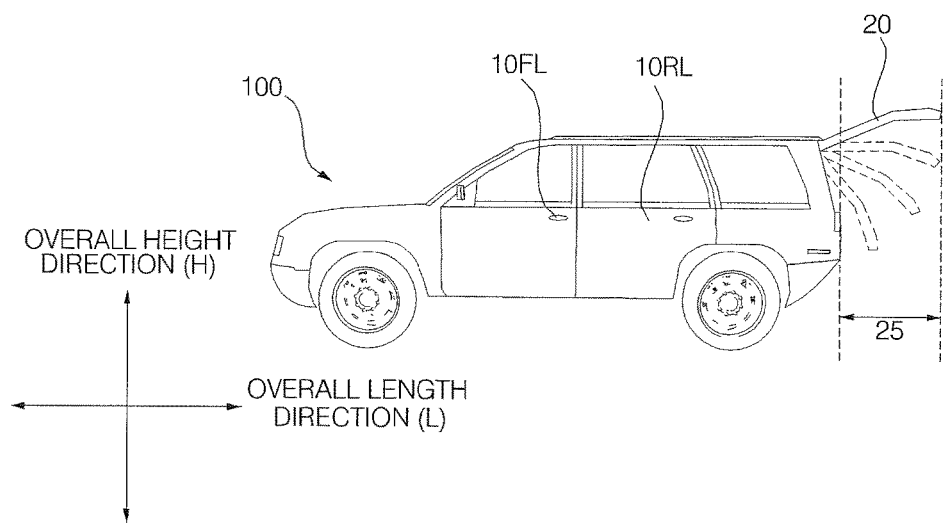

Referring to FIG. 1B, the vehicle 100 may include the tailgate 20. The tailgate 20 may be included in a vehicle such as an SUV, MPV, van, wagon or hatchback. In general, the tailgate 20 may be rotated in the upper and lower directions of the ground to be opened or closed. In order to open the tailgate 20, a space having a predetermined length from the body of the vehicle 100 is required. That is, when viewing the vehicle from the side, a space having a predetermined length 25 from a rear bumper of the vehicle to the rear side of the vehicle 100 should be secured, in order to open the tailgate 20.

If the tailgate 20 is opened in a state in which the space is not secured, the tailgate 20 may be damaged or an object or person near the vehicle may be damaged or injured.

In order to prevent such damage, the vehicle 100 may include the vehicle door control apparatus 200 according to the implementation.

Figure 1C:
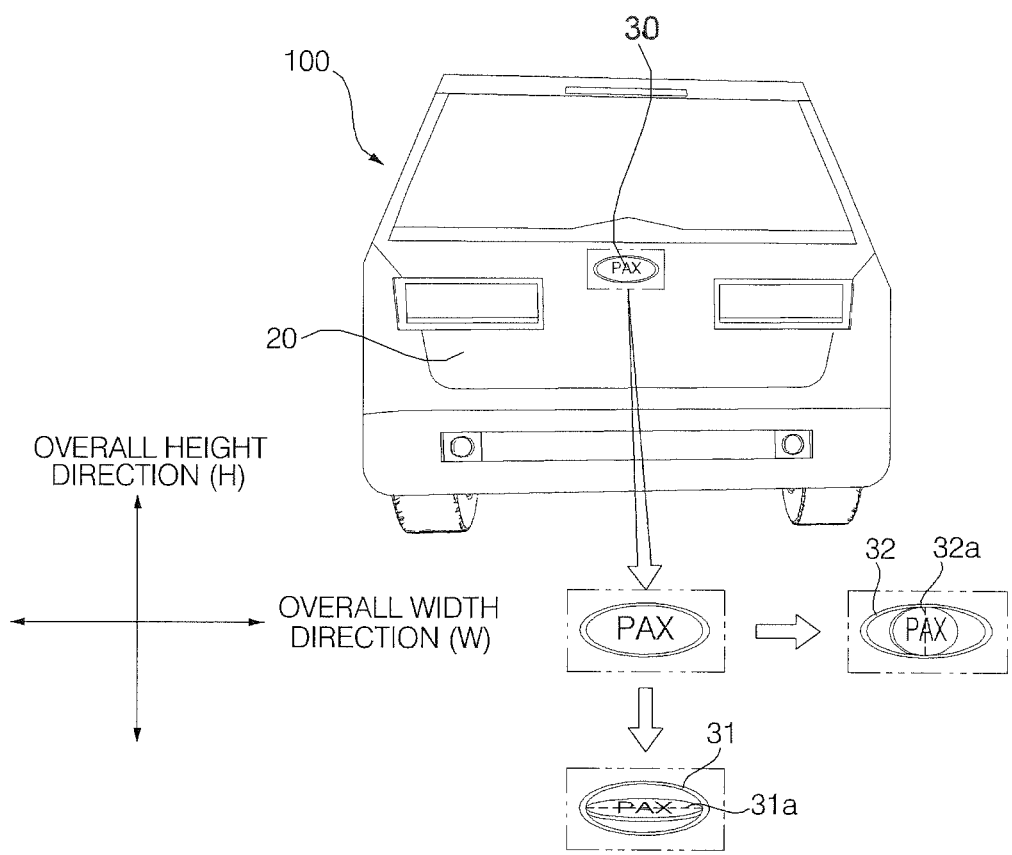

Referring to FIG. 1C, an emblem 30 of a vehicle manufacturer may be formed in one area of the tailgate 20. In some implementations, the emblem 30 may be configured to cover a sensor (e.g., sensor 225 of FIG. 3). As such, a sensor (e.g., sensor 225 of FIG. 3) included in the vehicle door control apparatus 200 may be concealed by the emblem 30.

As shown in FIG. 1C, the emblem may be configured to rotate. For example, the emblem 30 may be formed on the tailgate 20 to rotate in an upper-and-lower direction about a horizontal axis 31a or to rotate about the overall horizontal width direction 31. Alternatively, the emblem 30 may be formed on the tailgate 20 to rotate in a right-and-left direction about a vertical axis 32a or to rotate about the overall height direction 32, as shown in FIG. 1C.

Figure 1D:
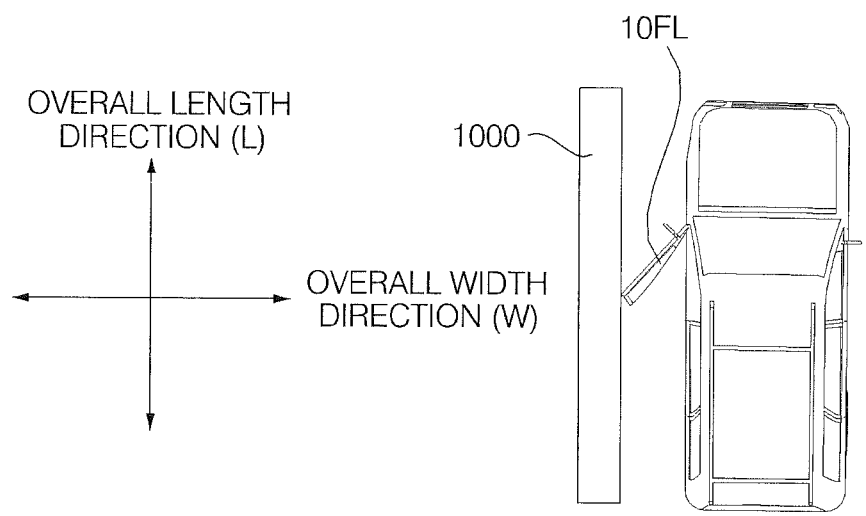

FIG. 1D is a view referenced to explain operation of the vehicle door control apparatus when a door is a side door according to an implementation.

Referring to FIG. 1D, if an object 1000 is located around the vehicle 100, when the side door 10FL is opened, the side door 10FL and the object 1000 may be come into contact with each other. In order to prevent contact, a processor 270 included in the vehicle door control apparatus 200 may control opening of the door 10FL within a range within which the side door 10FL and the object 1000 do not come into contact with each other.

Figure 2:
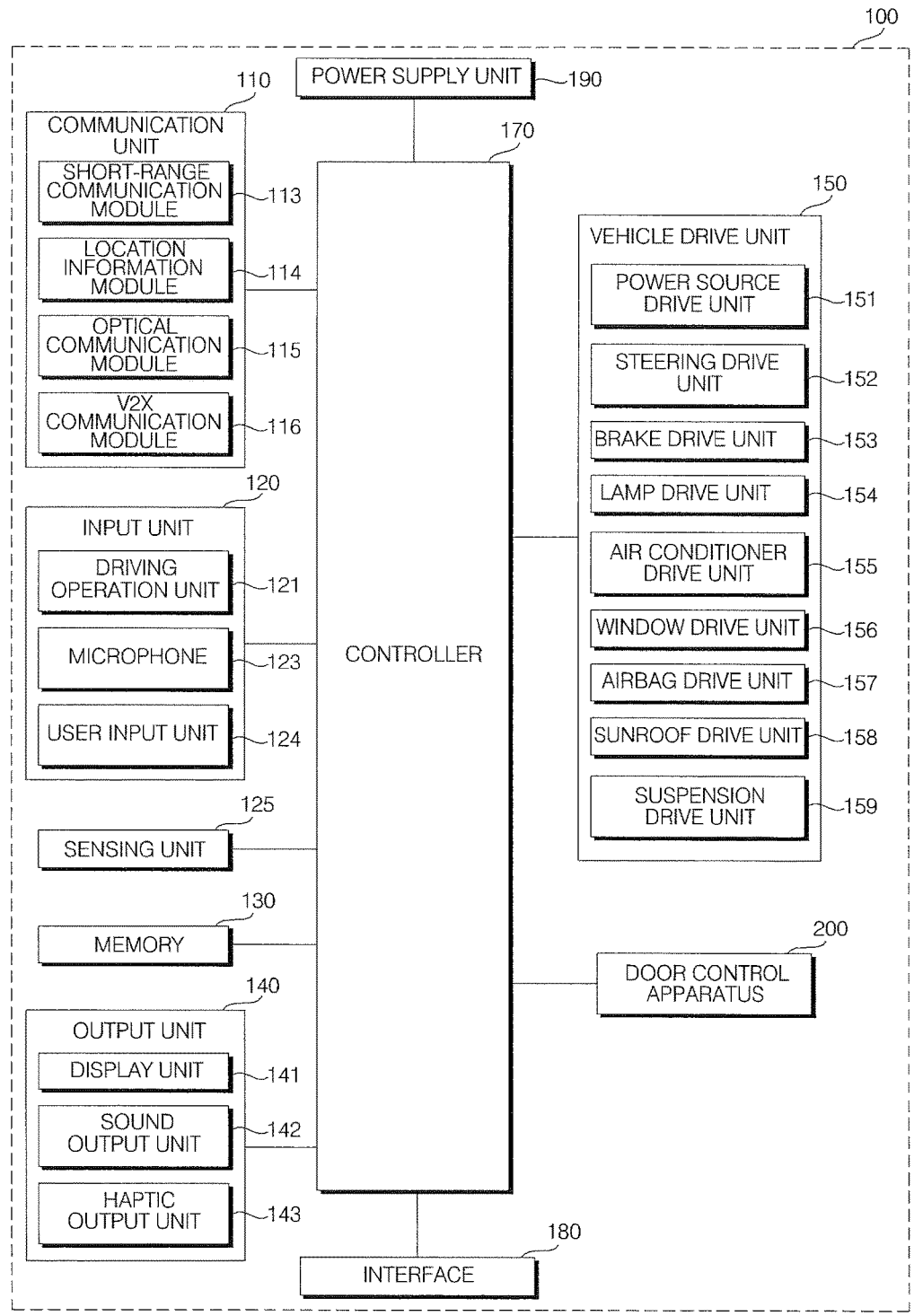
FIG. 2 is a block diagram illustrating an example of various components of a vehicle.

FIG. 2 is a block diagram referenced to explain a vehicle according to the implementation.

Referring to FIG. 2, the vehicle 100 may include a communication unit 110, an input unit 120, a sensing unit 125, a memory 130, an output unit 140, a vehicle drive unit 150, a controller 170, an interface 180, a power supply unit 190, and a vehicle door control device 200.

The communication unit 110 may include a short-range communication module 113, a location information module 114, an optical communication module 115 and a V2X communication module 116.

The short-range communication module 113 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 113 may form short-range wireless area networks to perform short-range communication between the vehicle 100 and at least one external device. For example, the short-range communication module 113 may exchange data with a mobile terminal in a wireless manner. The short-range communication module 113 may receive weather information and road traffic state information (e.g., Transport Protocol Experts Group (TPEG) information) from the mobile terminal. When a user enters the vehicle 100, the mobile terminal of the user and the vehicle 100 may pair with each other automatically or as the user executes a pairing application.

The location information module 114 is a module to acquire a location of the vehicle 100. A representative example of the location information module 114 includes a Global Positioning System (GPS) module. For example, when the vehicle utilizes a GPS module, a location of the vehicle 100 may be acquired using signals transmitted from GPS satellites.

In some implementations, the location information module 114 may not be included in the communication unit 110 but may be included in the sensing unit 125.

The optical communication module 115 may include a light emitting unit and a light receiving unit.

The light receiving unit may convert light into electrical signals to receive information. The light receiving unit may include Photodiodes (PDs) for receiving light. The photodiodes may convert light into electrical signals. For example, the light receiving unit may receive information regarding a preceding vehicle via light emitted from a light source included in the preceding vehicle.

The light emitting unit may include at least one light emitting element for converting electrical signals into light. Here, the light emitting element may be a Light Emitting Diode (LED). The light emitting unit converts electrical signals into light to emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle 100. For example, the light emitting unit may be at least one selected from among a headlight, a taillight, a brake light, a turn signal, and a sidelight. For example, the optical communication module 115 may exchange data with another vehicle via optical communication.

The V2X communication module 116 performs wireless communication with a server or another vehicle. The V2X module 116 includes a module for implementing a vehicle-to-vehicle (V2V) or vehicle-to-infrastructure (V2I) communication protocol. The vehicle 100 may perform wireless communication with an external server and another vehicle through the V2X communication module 116.

The input unit 120 may include a driving operation unit 121, a microphone 123, and a user input unit 124.

The driving operation unit 121 is configured to receive user input for driving of the vehicle 100. The driving operation unit 121 may include a steering input unit, a shift input unit, an acceleration input unit, and a brake input unit.

The steering input unit is configured to receive user input with regard to the direction of travel of the vehicle 100. The steering input unit may include a steering wheel. In some implementations, the steering input unit 121a may be configured as a touchscreen, a touch pad, or a button.

The shift input unit is configured to receive input for selecting one of Park (P), Drive (D), Neutral (N), and Reverse (R) gears of the vehicle 100 from the user. The shift input unit 121b may have a lever form. In some implementations, the shift input unit may be configured as a touchscreen, a touch pad, or a button.

The acceleration input unit 121c is configured to receive user input for acceleration of the vehicle 100. The brake input unit 121d is configured to receive user input for speed reduction of the vehicle 100. Each of the acceleration input unit and the brake input unit may have a pedal form. In some implementations, the acceleration input unit or the brake input unit may be configured as touchscreen, a touch pad, or a button.

The microphone 123 may process external sound signals into electrical data. The processed data may be utilized in various ways according to a function that the vehicle 100 is performing. The microphone 123 may convert a user voice command into electrical data. The converted electrical data may be transmitted to the controller 170.

In some implementations, a camera 122 or the microphone 123 may not be included in the input unit 120 but may be included in the sensing unit 125.

The user input unit 124 is configured to receive information from the user. When information is input via the user input unit 124, the controller 170 may control the operation of the vehicle 100 to correspond to the input information. The user input unit 124 may include a touch input unit or a mechanical input unit. In some implementations, the user input unit 124 may be located in a region of the steering wheel. In this case, the driver may operate the user input unit 124 with the fingers while gripping the steering wheel.

The sensing unit 125 is configured to sense signals associated with, for example, various states or external states of the vehicle 100. To this end, the sensing unit 125 may include various types of sensors, examples of which include but are not limited to a collision sensor, a wheel sensor, a speed sensor, gradient sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, an illuminance sensor, an acceleration pedal position sensor, a brake pedal position sensor, etc.

As such, the sensing unit 125 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, information on external illuminance of the vehicle, information on pressure applied to the acceleration pedal, information on pressure applied to the brake pedal, etc.

Meanwhile, the sensing unit 125 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The location information module 114 may be classified as a subcomponent of the sensing unit 125.

The sensing unit 125 may include an object sensing unit for sensing an object located around the vehicle. Here, the object sensing unit may include a camera module, a radar, a Lidar, and an ultrasonic sensor. In this case, the sensing unit 125 may sense a front object located in front of the vehicle or a rear object located behind the vehicle through the camera module, the radar, the Lidar or the ultrasonic sensor.

The sensing unit 125 may include a camera module. In some implementations, the camera module may include an external camera module for capturing an image of the outside of the vehicle, and an internal camera module for capturing an image of the space inside the vehicle 100.

The external camera module may include one or more cameras for capturing the image of the outside of the vehicle 100. The external camera module may include, for example, an around view monitoring (AVM) apparatus, a blind spot detection (BSD) apparatus, and/or a rear camera apparatus.

The AVM apparatus may synthesize a plurality of images acquired by a plurality of cameras to provide an image of a view around the vehicle. The AVM apparatus may synthesize and convert a plurality of images into an image conveniently visible to a user and display the image. For example, the AVM apparatus may synthesize and convert a plurality of images into a top-view image and display the top-view image.

For example, the AVM apparatus may include first to fourth cameras. In this case, the first camera may be located around a front bumper, a radiator grille, an emblem or a windshield. The second camera may be located on a left side mirror, a left front door, a left rear door and a left fender. The third camera may be located on a right side mirror, a right front door, a right rear door or a right fender. The fourth camera may be located around a rear bumper, an emblem or a license plate.

The BSD apparatus may detect an object from the images acquired by one or more cameras and output an alarm when it is determined that collision with the object may occur.

For example, the BSD apparatus may include first and second cameras. In this case, the first camera may be located on a left side mirror, a left front door, a left rear door or a left fender. The second camera may be located on a right side mirror, a right front door, a right rear door or a right fender.

The rear camera apparatus may include a camera for acquiring an image of the rear side of the vehicle.

For example, the rear camera apparatus may be located near a rear bumper, an emblem or a license plate.

The camera of the sensors (e.g., 225 of FIG. 3) included in the vehicle door control device 200 may be included in any one of the AVM apparatus, the BSD apparatus and the rear camera apparatus included in the vehicle 100.

In some implementations, the internal camera module may include one or more cameras for capturing the image of the internal space of the vehicle 100. For example, the internal camera may acquire an image of a passenger.

The processor of the internal camera module may acquire the image of the passenger of the vehicle 100 and detect the number of passengers and in which seat the passenger sits. For example, the internal camera module may detect whether a fellow passenger gets into the vehicle and in which seat the fellow passenger sits.

The memory 130 is electrically connected to the controller 170. The memory 130 may store basic data of the unit, control data for operation control of the unit and input/output data. The memory 130 may be various storage apparatuses, which are implemented in a hardware manner, such as a ROM, RAM, EPROM, flash drive and hard drive. The memory 130 may store a variety of data for overall operation of the vehicle 100, such as a program for processing or control of the controller 170.

The output unit 140 is configured to output information processed in the controller 170. The output unit 140 may include a display unit 141, a sound output unit 142, and a haptic output unit 143.

The display unit 141 may display various graphical objects. For example, the display unit 141 may display vehicle associated information. Here, the vehicle associated information may include vehicle control information for direct control of the vehicle or driver assistance information for guiding driving of the vehicle. In addition, the vehicle associated information may include vehicle state information that indicates the current state of the vehicle or vehicle traveling information regarding traveling of the vehicle.

The display unit 141 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 141 may configure an inter-layer structure with a touch sensor, or may be integrally formed with the touch sensor to implement a touchscreen. The touchscreen may function as the user input unit 124 which provides an input interface between the vehicle 100 and the user and also function to provide an output interface between the vehicle 100 and the user. In this case, the display unit 141 may include a touch sensor which senses a touch to the display unit 141 so as to receive a control command in a touch manner. When a touch is input to the display unit 141 as described above, the touch sensor may sense the touch and the controller 170 may generate a control command corresponding to the touch. Content input in a touch manner may be characters or numbers, or may be, for example, instructions in various modes or menu items that may be designated.

Meanwhile, the display unit 141 may include a cluster to allow the driver to check vehicle state information or vehicle traveling information while driving the vehicle. The cluster may be located on a dashboard. In this case, the driver may check information displayed on the cluster while looking forward.

Meanwhile, in some implementations, the display unit 141 may be implemented as a head up display (HUD). When the display unit 141 is implemented as a HUD, information may be output via a transparent display provided at the windshield. Alternatively, the display unit 141 may include a projector module to output information via an image projected onto the windshield.

In some implementations, the display unit 141 may include a transparent display. In this case, the transparent display may be attached to the windshield.

The transparent display may display a predetermined screen with predetermined transparency. The transparent display may include at least one of a transparent thin film electroluminescent (TFEL) display, a transparent organic light emitting diode (OLED) display, a transparent liquid crystal display (LCD), a transmission-type transparent display and a transparent light emitting diode (LED) display. Transparency of the transparent display may be adjusted.

The sound output unit 142 is configured to convert electrical signals from the controller 170 into audio signals and to output the audio signals. To this end, the sound output unit 142 may include, for example, a speaker. The sound output unit 142 may output sound corresponding to the operation of the user input unit 124.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control the operation of various devices of the vehicle. The vehicle drive unit 150 may include at least one of a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control of a power source inside the vehicle 100.

For example, in the case where a fossil fuel based engine is a power source, the power source drive unit 151 may perform electronic control of the engine. As such, the power source drive unit 151 may control, for example, an output torque of the engine. In the case where the power source drive unit 151 is an engine, the power source drive unit 151 may control the speed of the vehicle by controlling the output torque of the engine under the control of the controller 170.

In another example, in the case where an electric motor is a power source, the power source drive unit 151 may perform control of the motor. As such, the power source drive unit 151 may control, for example, the RPM and torque of the motor.

The steering drive unit 152 may perform electronic control of a steering apparatus inside the vehicle 100. The steering drive unit 152 may change the direction of travel of the vehicle.

The brake drive unit 153 may perform electronic control of a brake apparatus inside the vehicle 100. For example, the brake drive unit 153 may reduce the speed of the vehicle 100 by controlling the operation of brakes located at wheels. In another example, the brake drive unit 153 may adjust the direction of travel of the vehicle 100 leftward or rightward by differentiating the operation of respective brakes located at left and right wheels.

The lamp drive unit 154 may turn at least one lamp arranged inside and outside the vehicle 100 on or off. In addition, the lamp drive unit 154 may control, for example, the intensity and direction of light of each lamp. For example, the lamp drive unit 154 may perform control of a turn signal lamp or a brake lamp.

The air conditioner drive unit 155 may perform electronic control of an air conditioner inside the vehicle 100. For example, when the interior temperature of the vehicle 100 is high, the air conditioner drive unit 155 may operate the air conditioner to supply cold air to the interior of the vehicle 100.

The window drive unit 156 may perform electronic control of a window apparatus inside the vehicle 100. For example, the window drive unit 156 may control opening or closing of left and right windows of the vehicle 100.

The airbag drive unit 157 may perform the electronic control of an airbag apparatus inside the vehicle 100. For example, the airbag drive unit 157 may control an airbag to be deployed in a dangerous situation.

The sunroof drive unit 158 may perform electronic control of a sunroof apparatus inside the vehicle 100. For example, the sunroof drive unit 158 may control opening or closing of a sunroof.

The suspension drive unit 159 may perform electronic control of a suspension apparatus inside the vehicle 100. For example, when a road surface is uneven, the suspension drive unit 159 may control the suspension apparatus to reduce vibrations of the vehicle 100.

In some implementations, the vehicle drive unit 150 may include a chassis drive unit. The chassis drive unit may include the steering drive unit 152, the brake drive unit 153 and the suspension drive unit 159.

The controller 170 may control the overall operation of each unit inside the vehicle 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The interface 180 may serve as a passage for various kinds of external devices that are connected to the vehicle 100. For example, the interface 180 may have a port that is connectable to a mobile terminal and may be connected to the mobile terminal via the port. In this case, the interface 180 may exchange data with the mobile terminal.

The interface 180 may serve as a passage for providing electric energy to the connected mobile terminal. When the mobile terminal is electrically connected to the interface 180, the interface 180 may provide electric energy supplied from the power supply unit 190 to the mobile terminal under control of the controller 170.

The power supply unit 190 may supply power required to operate the respective components under the control of the controller 170. In particular, the power supply unit 190 may receive power from, for example, a battery inside the vehicle 100.

The vehicle door control apparatus 200 may control opening or closing of various doors included in the vehicle 100. Hereinafter, the vehicle door control apparatus 200 will be focused upon.

Figure 3:
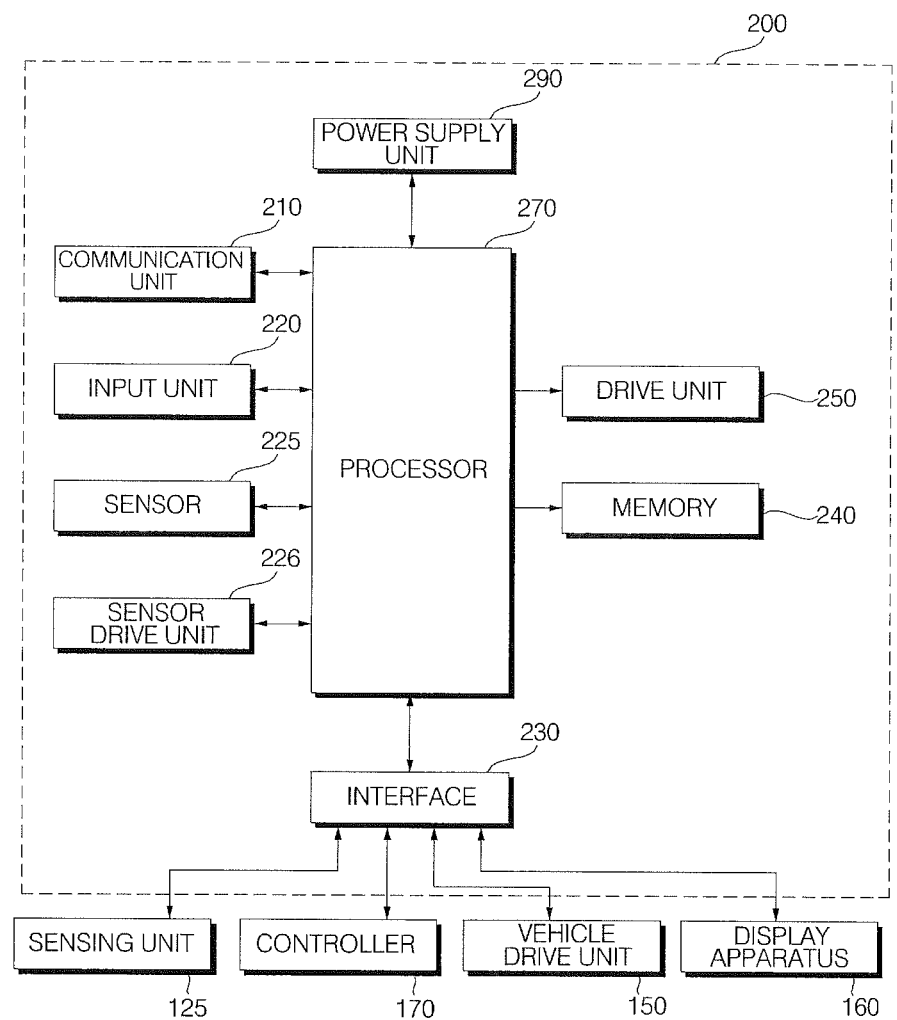
FIG. 3 is a block diagram illustrating an example of a vehicle door control apparatus.

FIG. 3 is a block diagram referenced to explain a vehicle door control apparatus according to the implementation.

Referring to FIG. 3, the vehicle door control apparatus 200 may include a communication unit 210, an input unit 220, a sensor 225, a sensor drive unit 226, an interface 230, a drive unit 250, a processor 270 and a power supply unit 290.

The communication unit 210 may exchange data with another device located outside or inside the vehicle 100 in a wireless manner. Here, the other device may include a mobile terminal, a server or another vehicle.

For example, the communication unit 210 may exchange data with a mobile terminal of a vehicle driver in a wireless manner. A wireless data communication method includes various data communication methods such as Bluetooth, Wi-Fi Direct, Wi-Fi, APiX or NFC.

For example, the communication unit 210 may receive weather information and road traffic state information (e.g., Transport Protocol Experts Group (TPEG) information) from the mobile terminal or the server.

When a user gets into the vehicle 100, the mobile terminal of the user and the vehicle door control apparatus 200 may pair with each other automatically or as the user executes a pairing application.

The communication unit 210 may receive traffic light change information from an external server. Here, the external server may be located at a traffic control center for controlling traffic.

The input unit 220 may receive user input. The input unit 220 may include a mechanical input device, a touch input device, a voice input device or a wireless input device.

The mechanical input device may include a button, a lever, a jog wheel, a switch, etc. For example, the input unit 220 may be provided in one area of a tailgate (e.g., tailgate 20 of FIGS. 1B to 10). The input unit 220 may be provided around an emblem (e.g., emblem 30 of FIG. 10). The input unit 220 may be provided inside the emblem (e.g., 30 of FIG. 10) in the form of a lever. In this case, the lever may receive a plurality of inputs according to a motion amount.

The touch input device may include at least one touch sensor. The touch input device may include a touchscreen.

The voice input device may include a microphone for converting user voice into an electrical signal.

The wireless input device may receive wireless user input via a key outside the vehicle 100.

The input unit 220 may receive user input for opening or closing of the door included in the vehicle 100.

The sensor 225 may sense an object located around the vehicle 100. For example, the sensor 225 may be configured to sense objects such as a person, a two-wheeled vehicle, another vehicle, a structure, etc., located around the vehicle 100. The structure may be, for example, an object fixed on the ground, such as a wall, a tree, a street lamp or a pillar.

The sensor 225 may include various types of sensors for sensing an object around the vehicle. For example, the sensor 225 may include a camera, an ultrasonic sensor, a radar, and/or a Lidar. In some implementations, the sensor 225 is used to detect the object located at a short distance and thus may preferably include a camera or an ultrasonic sensor.

The sensor 225 may be located on the door of the vehicle. For example, the sensor 225 may be provided in one area of the tailgate (e.g., tailgate 20 of FIGS. 1B to 1C). In some implementations, the sensor 225 may be concealed by the emblem (e.g., emblem 30 of FIG. 1c) on the tailgate. In this case, the sensor 225 may be concealed by the emblem (e.g., 30 of FIG. 1c) in a default state, and the sensor 225 may be exposed from the emblem to detect an object in state in which a first event occurs. The first event may be, for example, a door opening signal reception event received via the input unit 220.

In some implementations, the sensor 225 includes a camera, in which case the camera may be included in an around view monitoring (AVM) apparatus, a blind spot detection (BSD) apparatus, or a rear camera apparatus provided in the vehicle 100. For example, the sensor 225 may be a camera provided near the tailgate among the cameras included in the AVM apparatus or the rear camera apparatus.

The camera may detect an object based on the acquired image. The camera may include an image sensor and an image processor. In some implementations, the camera may be a stereo camera.

The image processor may process the acquired image and detect an object. The image processor may track the detected object. The image processor may detect the distance from the object. For example, the image processor may detect the distance from the object using a pinhole, a motion vector, disparity or size change of the object.

In some implementations, the camera may provide image data to the processor 270 and the processor 270 may perform image processing on the image data.

The ultrasonic sensor may include ultrasonic transmission and reception units. The ultrasonic sensor may detect an object based on a reception ultrasonic wave reflected from the object and detect the distance from the detected object.

In some implementations, the sensor 225 may be configured to move. For example, the sensor 225 may move about the same rotation axis as the opening trajectory of the door according to rotation. The sensor 225 may rotate when the door rotates about a predetermined axis in a state in which the sensor 225 is provided in one area of the door. Here, the axis may be formed in the overall width direction when the door is a tailgate. The axis may be formed in the overall height direction when the door is a side door. In this case, the sensor 225 may protrude from the door to rotate earlier than the door. The sensor 225 rotates earlier than the door, such that the sensor 225 senses whether an object is located within the opening trajectory of the door before the door is opened.

The sensor 225 may receive driving power from the sensor drive unit 226 and move about a rotation axis different from the door. For example, when the door rotates about a first axis in a state in which the sensor 225 is provided in one area of the door, the sensor 225 may rotate about a second axis. Here, the first and second axes may be formed in the overall width direction when the door is a tailgate. The first and second axes may be formed in the overall height direction when the door is a side door.

The sensor 225 may sense an object within a predetermined sensing range. Here, the sensing range may be changed in correspondence with motion of the door. For example, when the tailgate is opened in a state in which the sensor 225 is provided in the tailgate to sense the object in a predetermined sensing range, the sensing range of the sensor 225 may be changed such that the detected object is continuously tracked. The sensing range may be changed when the sensor 225 receives driving power from the sensor drive unit 226 and moves.

The sensor drive unit 226 may provide driving power for moving the sensor 225. For example, the sensor drive unit 226 may include a motor and at least one gear. The sensor drive unit 226 may operate under control of the processor 270.

The interface 230 may receive a variety of signals, information or data and transmit signals, information or data processed or generated in the processor 270 to an external device. The interface 230 may perform data communication with the controller 170, a vehicle display apparatus 160, the sensing unit 125, and the vehicle drive unit 150 inside the vehicle using a wired or wireless communication method.

The interface 230 may receive navigation information via data communication with the controller 170, the vehicle display apparatus 160 or a separate navigation apparatus. Here, the navigation information may include destination information, information on a route to the destination, map information related to vehicle traveling and current position information of the vehicle. The navigation information may include information on the position of the vehicle on the road.

The interface 230 may receive sensor information from the controller 170 or the sensing unit 125.

The sensor information may include various types of information related to the vehicle or the vehicle surroundings, for example, at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, and/or information as to whether it is raining.

Such sensor information may be acquired from various types of sensors, such as a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tier sensor, a steering sensor based on rotation of the steering wheel, a vehicle inner temperature sensor, a vehicle inner humidity sensor, and/or a rain sensor. The position module may include, for example, a GPS module for receiving GPS information.

Information related to vehicle traveling such as vehicle direction information, vehicle position information, vehicle angle information, vehicle speed information, and/or vehicle tilt information may be referred to as vehicle traveling information.

The interface 230 may provide a signal to the controller 170 or the vehicle drive unit 150. Here, the signal may be a control signal.

For example, the interface 230 may communicate with the power source drive unit 151 for controlling the power source. The interface 230 may provide the signal generated in the processor 270 to the power source drive unit 151.

For example, the interface 230 may communicate with the brake drive unit 153 for controlling the brake apparatus. The interface 230 may provide the signal generated in the processor 270 to the brake drive unit 153.

The memory 240 may store a variety of data for overall operation of the vehicle door control apparatus 200, such as a program for processing or control of the processor 270.

The memory 240 may be various storage apparatuses, which are implemented in a hardware manner, such as a ROM, RAM, EPROM, flash drive and hard drive. The memory 240 may be a subcomponent of the processor 270 in some implementations.

The drive unit 250 may provide driving power for opening or closing of the door.

The drive unit 250 may include an apparatus (e.g., a motor) for generating driving power. In some implementations, the drive unit 250 may include an electrically driven hinge. In this case, the door may be rotated by the driving power provided by the electrically driven hinge to be opened or closed.

The processor 270 may control overall operation of the components of the vehicle door control apparatus 200.

The processor 270 may be electrically connected to the communication unit 210, the input unit 220, the sensor 225, the sensor drive unit 226, the interface 230, the memory 240, the drive unit 250 and the power supply unit 290.

The processor 270 may receive object information from the sensor 225.

The processor 270 may control opening or closing of the door based on the object information sensed via the sensor 225.

For example, the processor 270 may provide a control signal to the drive unit 250. The processor 270 may control the drive unit 250 to control opening or closing of the door.

If the sensor 225 is concealed by the emblem (e.g., emblem 30 of FIG. 1C) formed in one area of the tailgate (e.g., tailgate 20 of FIGS. 1B to 10), the processor 270 may control motion of the emblem (e.g., 30 of FIG. 10) such that the sensor 225 is exposed, when a first event occurs. The first event may be an input signal reception event for opening the door, which is received via the input unit 220. Alternatively, the first event may be an input signal reception event for moving the emblem (e.g., 30 of FIG. 1C) received via the input unit 220.

For example, if the emblem (e.g., 30 of FIG. 10) may be rotated in the upper-and-lower direction or the right-and-left direction, the processor 270 may control rotation of the emblem (e.g., 30 of FIG. 10) in the upper-and-lower direction or the right-and-left direction, when the first event occurs.

For example, the input unit 220 may be a lever type input device provided around the emblem (e.g., 30 of FIG. 10). When an input signal for opening the door is received via the lever type input device, the processor 270 may control motion of the emblem (e.g., 30 of FIG. 10).

For example, the lever type input device may receive a plurality of inputs according to the motion amount of the lever. When input according to a first lever motion amount is received through the lever type input device, the processor 270 may control motion of the emblem (e.g., 30 of FIG. 10). When input according to a second lever motion amount is received through the lever type input device, the processor 270 may control opening of the door.

The processor 270 may receive object sensing information from the sensor 225.

The processor 270 may detect a distance between the door and the object. The processor 270 may detect the distance between the door and the object using a variety of distance-determining techniques, including but not limited to a pinhole, a motion vector, disparity or size change of the object.

The processor 270 may control opening or closing of the door based on the detected distance.

The processor 270 may control opening of the door to the extent to which the door does not come into contact with the object, when the detected distance is within a threshold or reference range. The threshold or reference range may be set based on contact between the object and the door and a space necessary for a passenger to exit the vehicle or contact between the object and the door and a space necessary to unload luggage. By such control, the door may be opened to the extent to which the minimum space necessary for the passenger to exit the vehicle or the minimum space necessary to unload luggage is secured.

The processor 270 may control the door not to be opened even when the first event occurs, if the detected distance is equal to or less than a threshold or reference distance. By such control, it is possible to prevent collision between the object and the door due to opening of the door.

The processor 270 may stop opening of the door if the object is located within the opening trajectory of the door when the door is opened. For example, if the object is detected in the opening trajectory of the door while the door is opened, the processor 270 may control the drive unit 250 to stop the opening of the door.

In some implementations, if the door is a tailgate (e.g., tailgate 20 of FIGS. 1B to 1C) and an object is located within the opening trajectory of the tailgate, the processor 270 may provide a signal for moving the vehicle 100 forward. The processor 270 may provide the signal to the power source drive unit 151 via the interface 230. For example, the processor 270 may provide a signal for moving the vehicle 100 forward such that the object moves out of the opening trajectory of the tailgate. For example, the processor 270 may control the tailgate to be opened while the vehicle 100 moves forward. By such control, if collision with the object is predicted upon opening the tailgate, the vehicle may move forward and then the tailgate may be opened without collision with the object. In addition, in some scenarios, by controlling opening of the tailgate while moving the vehicle, the delay of opening of the tailgate may be reduced while avoiding collision.

The processor 270 may also receive information regarding other objects around other areas of the vehicle to further improve safety of automated opening of the vehicle doors. For example, in some implementations, the processor 270 may receive information regarding a front object located in front of the vehicle via the interface 230. The front object may be sensed by the sensing unit (e.g., 125 of FIG. 2) of the vehicle 100.

In this scenario, if the front object is located on the movement path when the vehicle moves forward, the processor 270 may provide a signal for stopping the vehicle to the brake drive unit 153. By such control, when the vehicle moves forward to safely allow opening of the tailgate behind the vehicle, the processor 270 may help prevent collision between the resulting forward-moving vehicle and an object in front of the vehicle.

In some implementations, if a second event occurs in a state in which the tailgate (e.g., 20 of FIGS. 1B to 1C) is opened, the processor 270 may control the tailgate to be closed. The second event may be, for example, a door closing signal reception event received via the input unit 220. In some scenarios, the processor 270 may provide a signal for moving the vehicle 100 backwards in correspondence with the closing speed of the tailgate. The processor 270 may provide the signal to the power source drive unit 151 via the interface 230.

The processor 270 may receive information on a rear object located behind the vehicle 100 via the interface 230. When the information on the rear object is received, the processor 270 may control the closing speed of the tailgate to be higher than that of the tailgate when the information on the rear object is not received. By such control, it is possible to prevent collision with the object.

The processor 270 may detect a distance from the object. The processor 270 may provide the signal for stopping the vehicle 100 to the brake drive unit 153, when the detected distance is equal to or less than the reference distance.

The processor 270 may stop closing of the door when the object is located within the closing trajectory of the door, when the door is closed.

If the door is a tailgate (e.g., 20 of FIGS. 1B to 1C) and the sensor 225 is rotatably formed, the processor 270 may control rotation of the sensor 225 such that the inside of the tailgate is sensed when the second event occurs.

The sensor 225 may be rotated about a predetermined axis. Here, the axis is parallel to the axis about which the tailgate rotates.

The sensor 225 may receive driving force from a motor and rotate under control of the processor 270.

The processor 270 may rotate the sensor 225 such that the sensor 225 senses the outside of the tailgate, upon opening the tailgate. For example, the processor 270 may control rotation of the sensor 225 in the same direction as the opening direction of the tailgate to sense the outside of the tailgate, when the first event occurs. Thereafter, the sensor may rotate in the same direction as the closing direction of the tailgate while the tailgate is opened, thereby changing the sensing range of the sensor 225. Thereafter, after the tailgate is completely opened, rotation of the sensor 225 is completed and the sensor 225 senses the inside of the tailgate.

The processor 270 may control the rotation speed of the sensor 225 in correspondence with the opening speed of the tailgate or the opening degree of the tailgate.

The processor 270 may rotate the sensor 225 such that the sensor 225 senses the outside of the tailgate, upon closing the tailgate. For example, the processor 270 may control rotation of the sensor 225 in the same direction as the closing direction of the tailgate to sense the inside of the tailgate, when the second event occurs. Thereafter, the sensor may rotate in the same direction as the opening direction of the tailgate while the tailgate is closed, thereby changing the sensing range of the sensor 225. Thereafter, after the tailgate is completely closed, rotation of the sensor 225 is completed and the sensor 225 senses the outside of the tailgate.

The processor 270 may control the rotation speed of the sensor 225 in correspondence with the closing speed of the tailgate or the closing degree of the tailgate.

The processor 270 may provide data such that a stop area in which the door may be opened or closed is displayed on the vehicle display apparatus 160 based on object information. In this case, the vehicle display apparatus 160 may display a stop area in which the door may be opened or closed within a range within which the object and the door do not come into contact with each other.

The processor 270 may provide a signal to the brake drive unit 153 such that the vehicle stops in the stop area in which the door may be opened or closed based on the object information.

If the door is a side door, the processor 270 may control opening of the door within the range within which the side door and the object do not come into contact with each other.

The processor 270 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for implementation of other functions.

The power supply unit 290 may supply power required to operate the respective components under control of the processor 270. In particular, the power supply unit 290 may receive power from, for example, a battery inside the vehicle 100.

Figure 4:
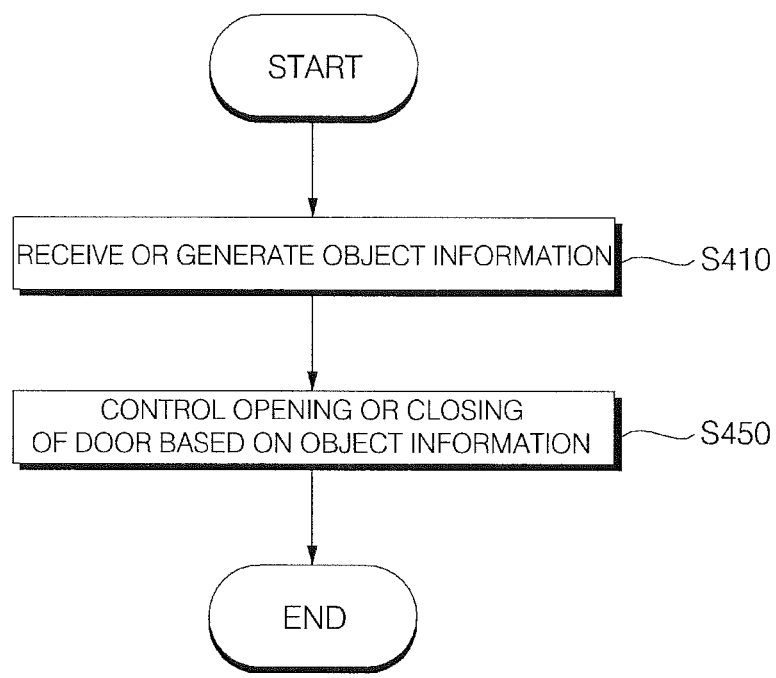
FIG. 4 is a flowchart illustrating an example operation of a vehicle door control apparatus.

FIG. 4 is a flowchart referenced to explain operation of a vehicle door control apparatus according to the implementation.

Referring to FIG. 4, the sensor 225 may sense an object. The processor 270 may receive object information from the sensor 225 (S410). Here, the object information may include information on presence/absence of an object, position information of the object, information on a distance between the object and the vehicle or information on a distance between the object and the door.

The processor 270 may generate object information. For example, if a camera is included in the sensor 225, the processor 270 may receive image data from the camera. The processor 270 may process the received image data, detect an object and generate object information.

The processor 270 may control opening or closing of the door based on the object information (S450). For example, the processor 270 may provide a control signal to the drive unit 250 and the drive unit 250 may provide driving power such that the door is opened or closed.

Referring to FIGS. 5 to 14D, operation according to an implementation of the vehicle door control apparatus will be described. Here, assume that the sensor 225 is a camera.

Figure 5:
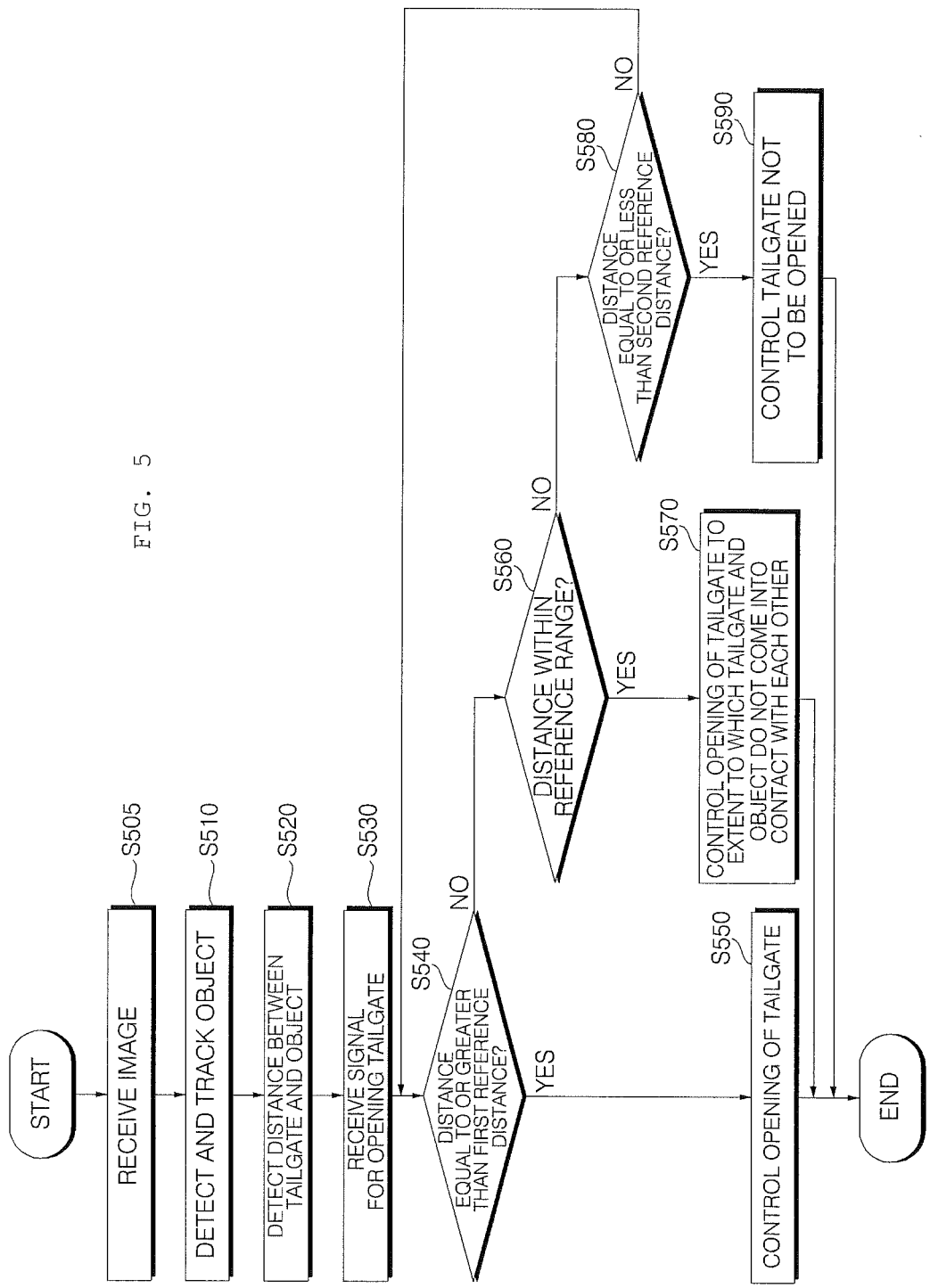
FIG. 5 is a flowchart illustrating an example operation of a vehicle door control apparatus.

FIG. 5 is a flowchart referenced to explain operation of a vehicle door control apparatus according to the implementation, and FIGS. 6A to 6D are views referenced to explain operation of FIG. 5 according to an implementation.

Referring to the figures, the processor 270 may receive an image from the camera of the sensing unit 225 (S505).

The camera may be provided in one area of the tailgate 20. The camera may acquire the image of the outside of the tailgate. The processor 270 may receive the image of the outside of the tailgate. The image of the outside of the tailgate may be a rear image of the vehicle in a state of closing the tailgate.

Figure 6A:
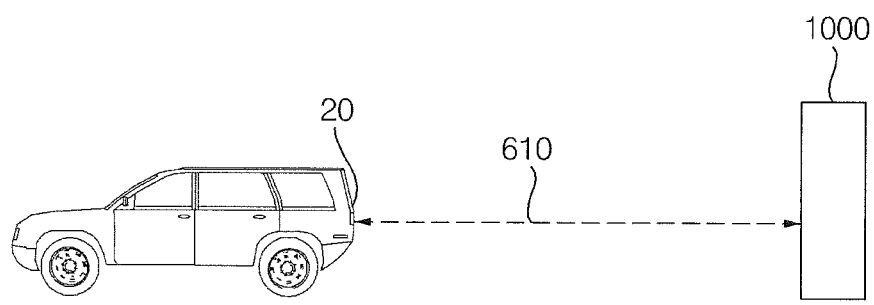
FIGS. 6A to 6D are diagrams illustrating examples of operations of a vehicle door control apparatus, such as that shown in FIG. 5.

As shown in FIG. 6A, the processor 270 may detect an object 1000 from the received image and track the detected object 1000 (S510). The processor 270 may detect a distance 610 between the tailgate 20 and the object 1000 (S520).

For example, the processor 270 may detect the distance 610 between the tailgate 20 and the object 1000 using a pinhole, a motion vector, disparity or size change of the object.

For example, when the vehicle 100 moves, the object 1000 detected from the received image may appear to move. At this time, the processor 270 may detect the distance 610 between the tailgate 20 and the object 1000 based on change in motion of the object 1000 or change in size of the object 1000.

For example, when the vehicle 100 moves, the processor 270 may detect the distance 610 between the tailgate 20 and the object 1000 based on disparity detected by tracking the object 1000 in an image of a first frame and an image of a second frame received from the camera.

The processor 270 may receive a signal for opening the tailgate 20 through the input unit 220.

Figure 6B:
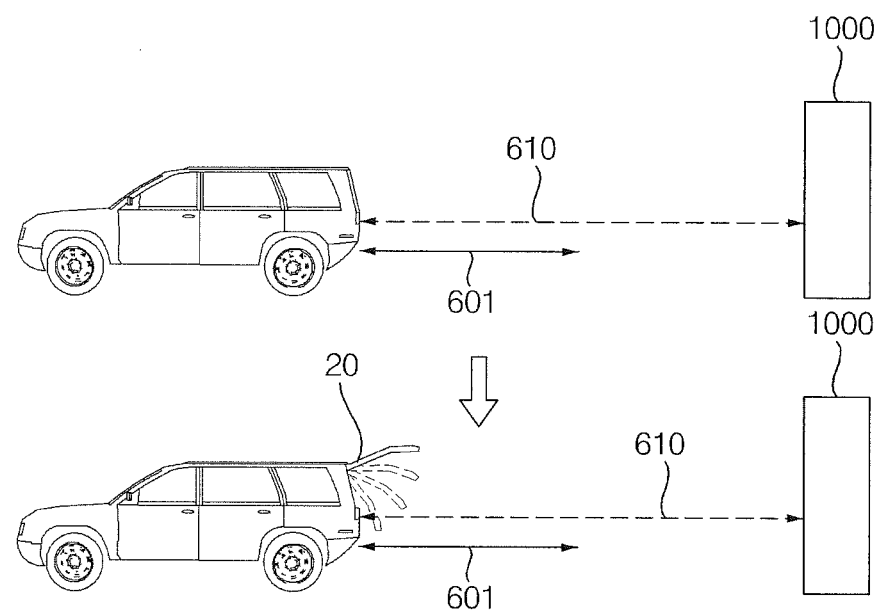

As shown in FIG. 6B, the processor 270 may determine whether the detected distance 610 is equal to or greater than a first reference distance 601 (S540).

If the detected distance 610 is equal to or greater than the first reference distance 601, the processor 270 may control opening of the tailgate 20 (S550).

Figure 6C:
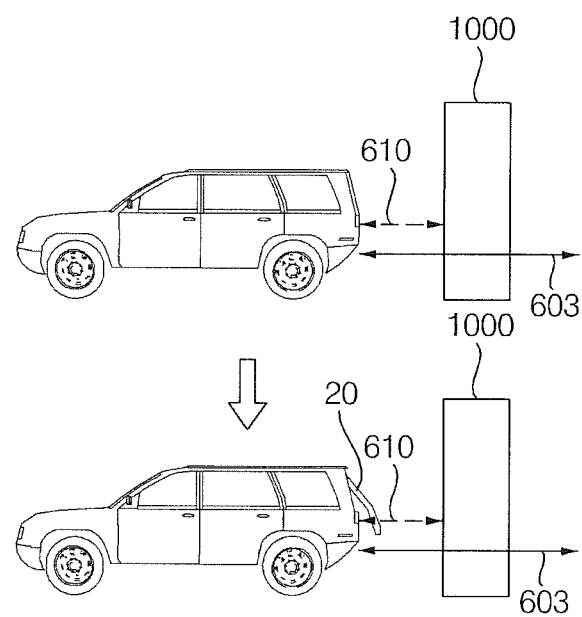

As shown in FIG. 6C, the processor 270 may determine whether the detected distance 610 is within a reference range 603 (S560).

If the detected distance 610 is within the reference range 603, the processor 270 may control the tailgate to be opened to the extent to which the tailgate 20 and the object 1000 do not come into contact with each other (S570).

Figure 6D:
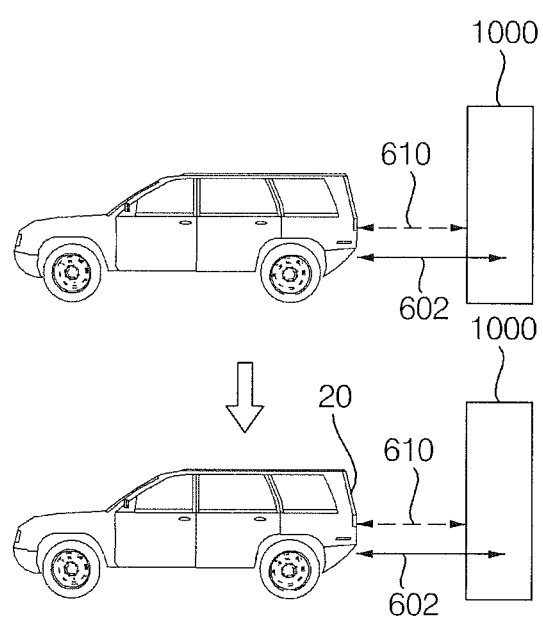

As shown in FIG. 6D, the processor 270 may determine whether the detected distance 610 is equal to or less than a second reference distance 602 (S580).

If the detected distance 610 is equal to or less than the second reference distance 602, the processor 270 may control the tailgate 20 not to be opened (S590).

Figure 7:
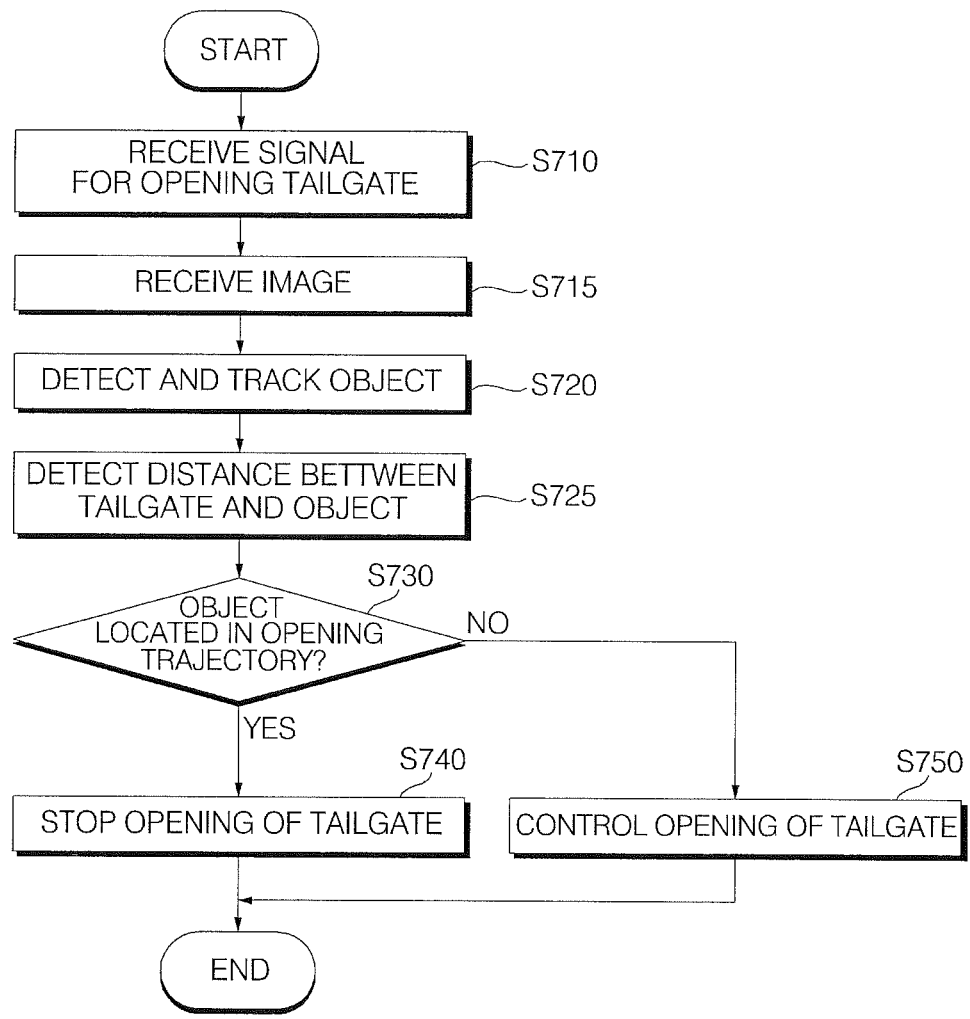
FIG. 7 is a flowchart illustrating an example operation of a vehicle door control apparatus.
Figure 8A:
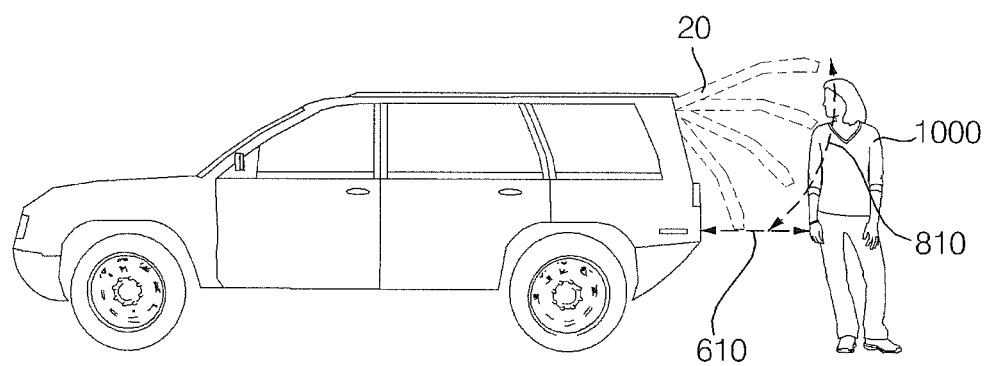
FIGS. 8A to 8C are diagrams illustrating examples of operations of a vehicle door control apparatus, such as that shown in FIG. 7.
Figure 8B:
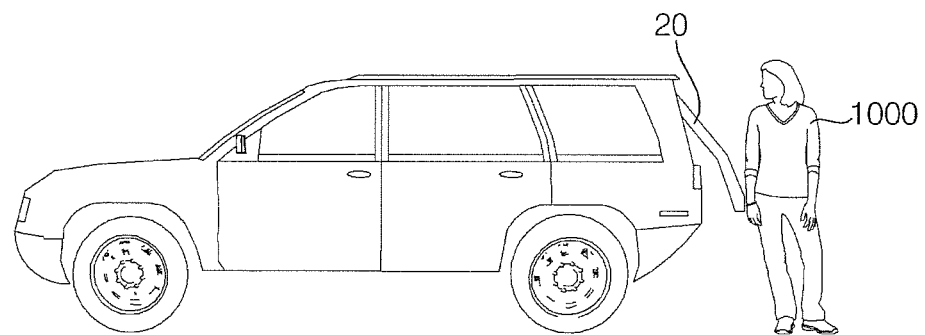
Figure 8C:
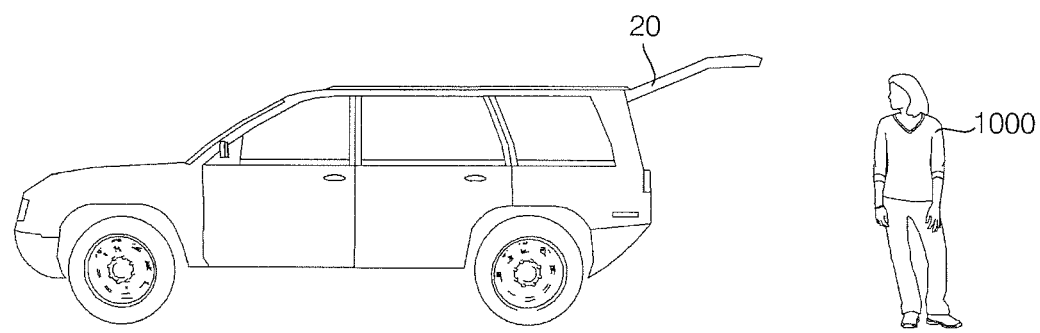

FIG. 7 is a flowchart referenced to explain operation of a vehicle door control apparatus according to the implementation, and FIGS. 8A to 8C are views referenced to explain operation of FIG. 7 according to an implementation.

Referring to the figures, the processor 270 may receive a signal for opening the tailgate 20 through the input unit 220 (S710).

The processor 270 may receive an image from the camera of the sensing unit 225 (S715).

The camera may be provided in one area of the tailgate (e.g., 20 of FIGS. 1B to 1C).

For example, the sensor 225 may be concealed by the emblem (e.g., 30 of FIG. 1C) provided in one area of the tailgate (e.g., 20 of FIGS. 1B to 1C). In this case, the camera may usually be concealed by the emblem (e.g., 30 of FIG. 1C) and may be exposed to detect an object when an input signal for opening the tailgate is received.

As shown in FIG. 8A, the processor 270 may detect the object 1000 from the received image and track the detected object 1000 (S720). The processor 270 may detect a distance 610 between the tailgate and the object 1000 (S725).

For example, the processor 270 may detect the distance 610 between the tailgate 20 and the object 1000 using a pinhole, a motion vector, disparity or size change of the object.

For example, when the tailgate 20 is opened, the object 1000 detected from the received image may appear to move. At this time, the processor 270 may detect the distance 610 between the tailgate 20 and the object 1000 based on change in motion of the object 1000 or change in size of the object 1000.

For example, when the tailgate 20 is opened, the processor 270 may detect the distance between the tailgate and the object 1000 based on disparity detected by tracking the object 1000 in an image of a first frame and an image of a second frame received from the camera.

The processor 270 may determine whether the object 1000 is located in the opening trajectory 810 of the tailgate 20 based on the detected distance 600 (S730).

As shown in FIG. 8B, if the object 1000 is located in the opening trajectory 810 of the tailgate 20, the processor 270 may stop opening of the tailgate 20 (S740). For example, if the object 1000 located in the opening trajectory is detected while the tailgate 20 is opened, the processor 270 may stop opening of the tailgate 20.

As shown in FIG. 8C, if the object 1000 is not located in the opening trajectory 810 of the tailgate 20, the processor 270 may control opening of the tailgate 20 (S750).

Figure 9:
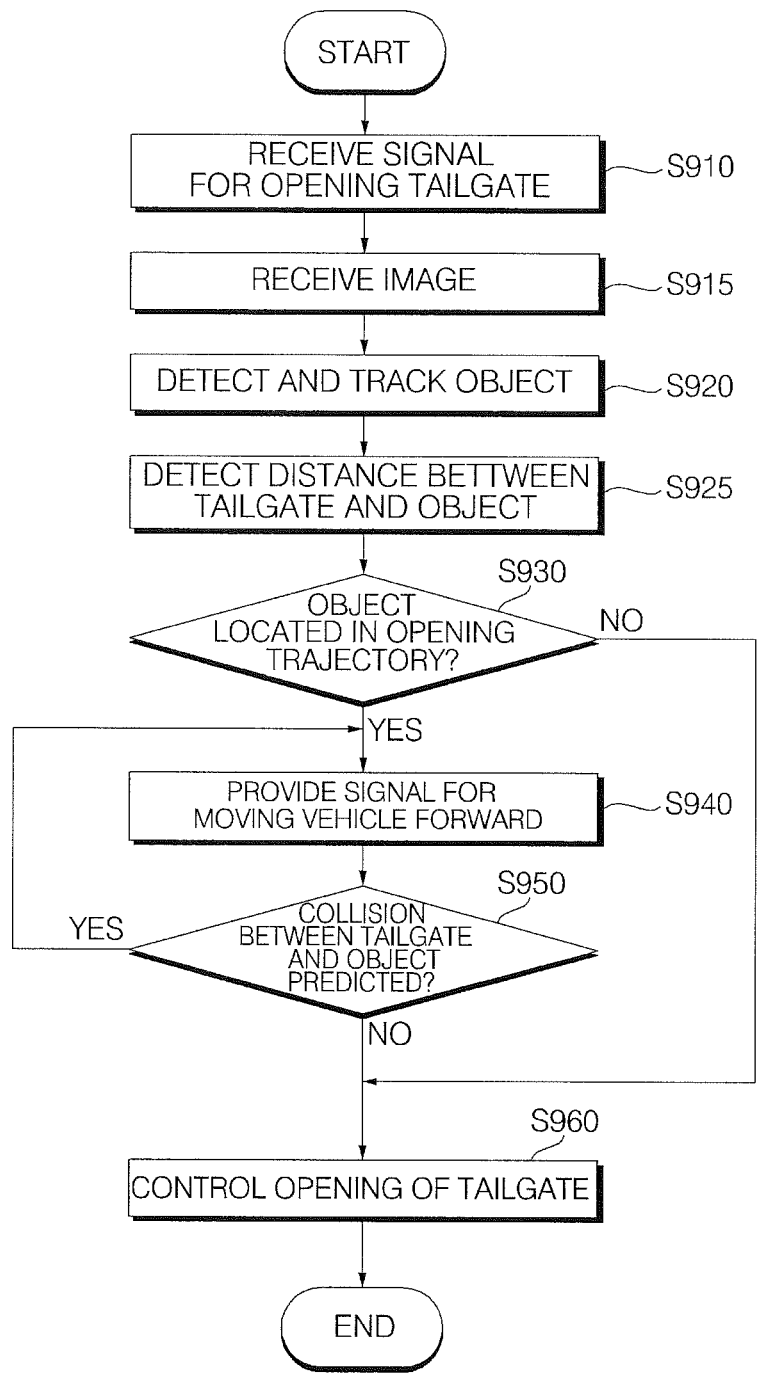
FIG. 9 is a flowchart illustrating an example operation of a vehicle door control apparatus.
Figure 10A:
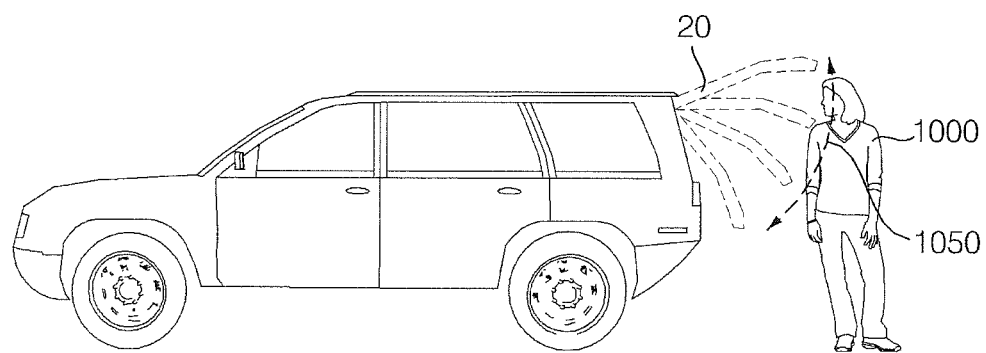
FIGS. 10A to 10C are diagrams illustrating examples of operations of a vehicle door control apparatus, such as that shown in FIG. 9.
Figure 10B:
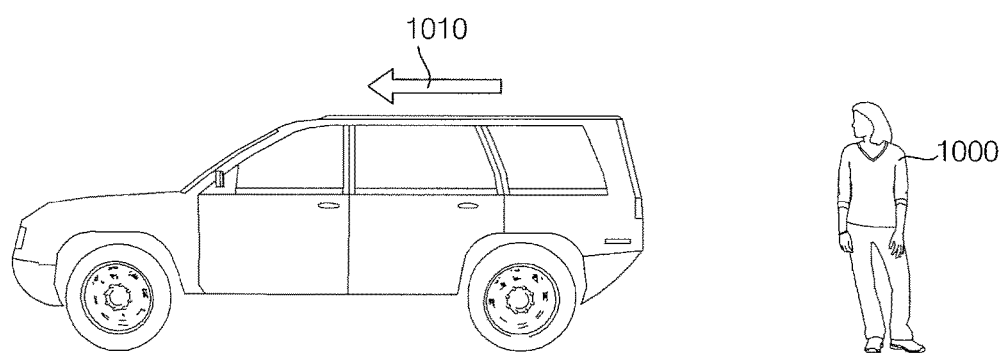
Figure 10C:
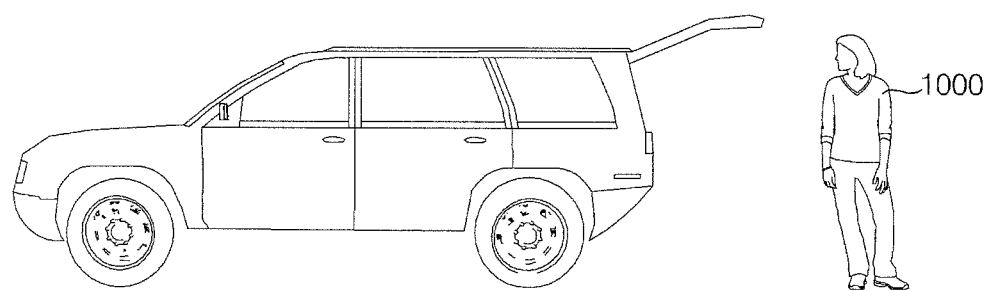

FIG. 9 is a flowchart referenced to explain operation of a vehicle door control apparatus according to the implementation, and FIGS. 10A to 10C are views referenced to explain operation of FIG. 9 according to an implementation.

Referring to the figures, the processor 270 may receive a signal for opening the tailgate 20 through the input unit 220 (S910).

The processor 270 may receive an image from the camera of the sensing unit 225 (S915).

The camera may be provided in one area of the tailgate (20 of FIGS. 1B to 10).

For example, the sensor 225 may be concealed by the emblem (30 of FIG. 10) provided in one area of the tailgate (20 of FIGS. 1B to 10). In this case, the camera may usually be concealed by the emblem (30 of FIG. 10) and may be exposed to detect an object when an input signal for opening the tailgate is received.

As shown in FIG. 10A, the processor 270 may detect the object 1000 from the received image and track the detected object 1000 (S920). The processor 270 may detect a distance between the tailgate and the object 1000, analogous to distance 610 in FIG. 8A (S925).

For example, the processor 270 may detect the distance 610 between the tailgate 20 and the object 1000 using a pinhole, a motion vector, disparity or size change of the object.

For example, when the tailgate 20 is opened, the object 1000 detected from the received image may appear to move. At this time, the processor 270 may detect the distance 610 between the tailgate 20 and the object 1000 based on change in motion of the object 1000 or change in size of the object 1000.

For example, when the tailgate 20 is opened, the processor 270 may detect the distance between the tailgate and the object 1000 based on disparity detected by tracking the object 1000 in an image of a first frame and an image of a second frame received from the camera.

The processor 270 may determine whether the object 1000 is located in the opening trajectory 810 of the tailgate 20 based on the detected distance (e.g., distance 610 in FIG. 8A) (S930).

As shown in FIG. 10B, if the object 1000 is located in the opening trajectory 1050 of the tailgate 20, the processor 270 may provide a signal for moving the vehicle 100 forward (1010) (S940). The processor 270 may provide the signal to the power source drive unit 151 through the interface 230. For example, the processor 270 may provide a signal for moving the vehicle 100 forward (1010) such that the object 1000 moves out of the opening trajectory of the tailgate.

The processor 270 may detect the distance between the tailgate 20 and the object 1000 from the continuously acquired image and determine whether the tailgate 20 collides with the object 1000 upon opening the tailgate 20 based on the detected distance (S950).

As shown in FIG. 10C, if it is determined that the tailgate 20 does not collide with the object 1000 upon opening the tailgate 20 by moving the vehicle 100, the processor 270 may control opening of the tailgate 20 (S960).

If it is determined that tailgate 20 collides with the object 1000, the processor 270 may provide a signal for moving the vehicle 100 forward (1010) (S940).

Meanwhile, the processor 270 may control opening of the tailgate 20 while the vehicle 100 moves forward. In this case, movement of the vehicle 100 and opening of the tailgate 20 may be controlled within a range within which the tailgate 20 does not collide with the object 1000.

Figure 11:
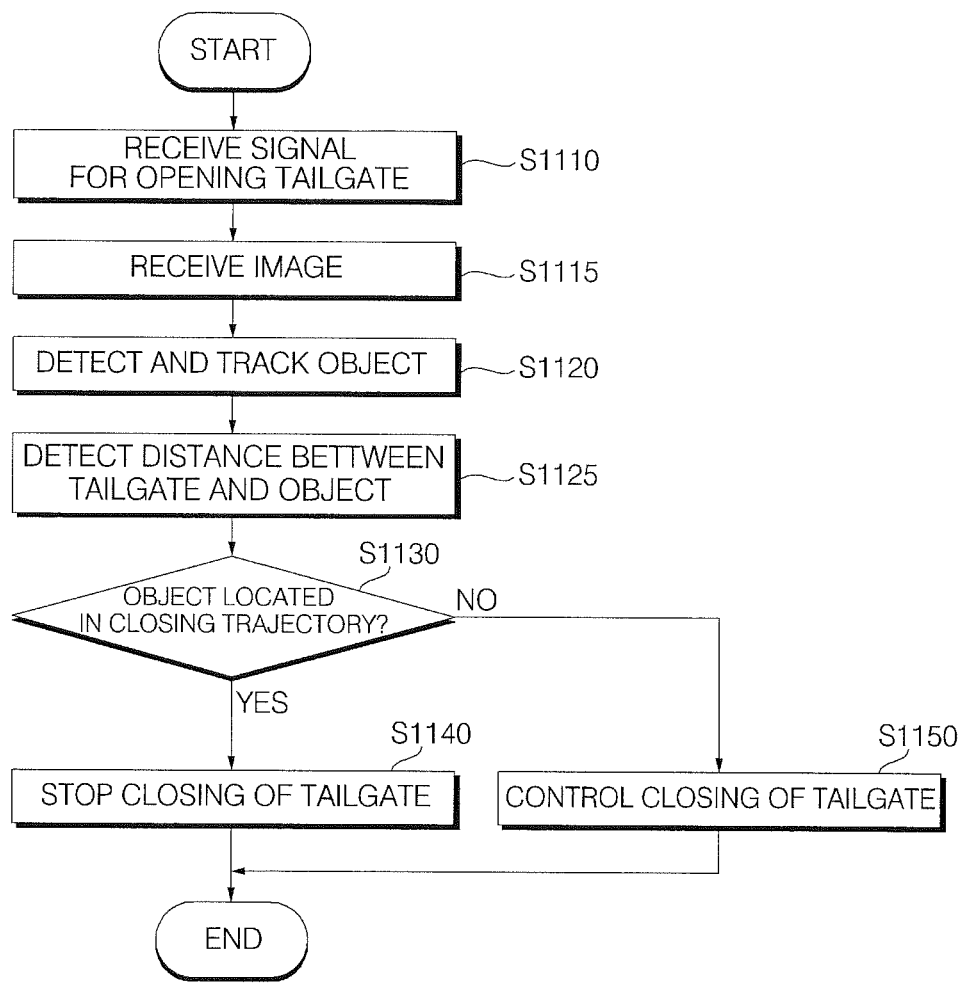
FIG. 11 is a flowchart illustrating an example operation of a vehicle door control apparatus.
Figure 12A:
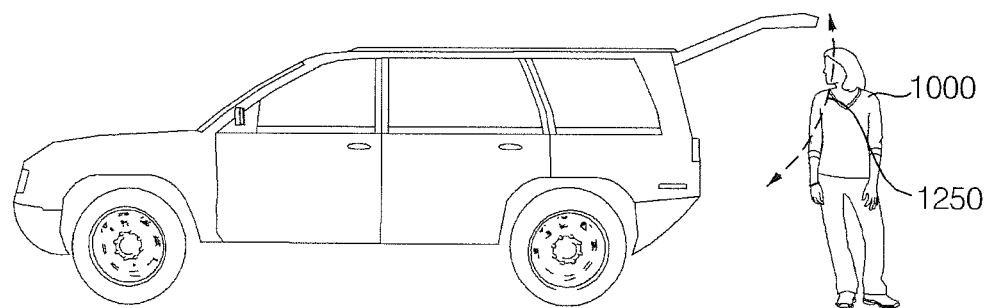
FIGS. 12A to 12C are diagrams illustrating examples of operation of a vehicle door control apparatus, such as that shown in FIG. 11.
Figure 12B:
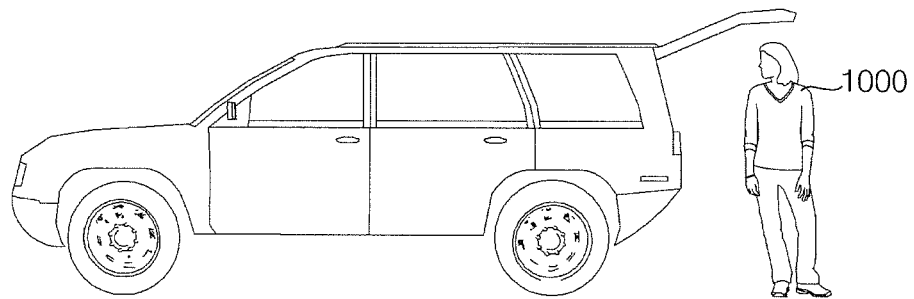
Figure 12C:
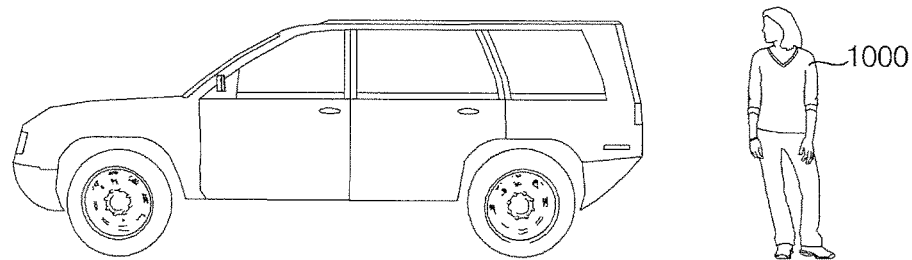

FIG. 11 is a flowchart referenced to explain operation of a vehicle door control apparatus according to the implementation, and FIGS. 12A to 12C are views referenced to explain operation of FIG. 11 according to an implementation.

Referring to the figures, in a state of opening the tailgate 20, the processor 270 may receive a signal for closing the tailgate 20 through the input unit 220 (S1110).

The processor 270 may receive an image from the camera of the sensing unit 225 (S1115).

The camera may be provided in one area of the tailgate (e.g., 20 of FIGS. 1B to 1D). The camera may be rotatably formed. The processor 270 may control rotation of the camera to sense the inside of the tailgate upon receiving the closing signal.

As shown in FIG. 12A, the processor 270 may detect the object 1000 from the received image and track the detected object 1000 (S1120). The processor 270 may detect a distance between the tailgate and the object 1000, analogous to detecting distance 610 in FIG. 8A (S1125).

For example, the processor 270 may detect the distance 610 between the tailgate 20 and the object 1000 using a pinhole, a motion vector, disparity or size change of the object.

For example, when the tailgate 20 is closed, the object 1000 detected from the received image may appear to move. At this time, the processor 270 may detect the distance 610 between the tailgate 20 and the object 1000 based on change in motion of the object 1000 or change in size of the object 1000.

For example, when the tailgate 20 is closed, the processor 270 may detect the distance between the tailgate 20 and the object 1000 based on disparity detected by tracking the object 1000 in an image of a first frame and an image of a second frame received from the camera.

The processor 270 may determine whether the object 1000 is located in the closing trajectory 1250 of the tailgate based on the detected distance (e.g., distance 610 in FIG. 8A) (S1130).

As shown in FIG. 12B, if the object 1000 is located in the closing trajectory 1250 of the tailgate 20, the processor 270 may stop closing of the tailgate 20 (S1140). For example, if the object 1000 located in the closing trajectory 1250 is detected while closing the tailgate 20, the processor 270 may stop closing of the tailgate 20.

As shown in FIG. 12C, if the object 1000 is not located in the closing trajectory 1250 of the tailgate 20, the processor 270 may control closing of the tailgate 20 (S1150).

Figure 13:
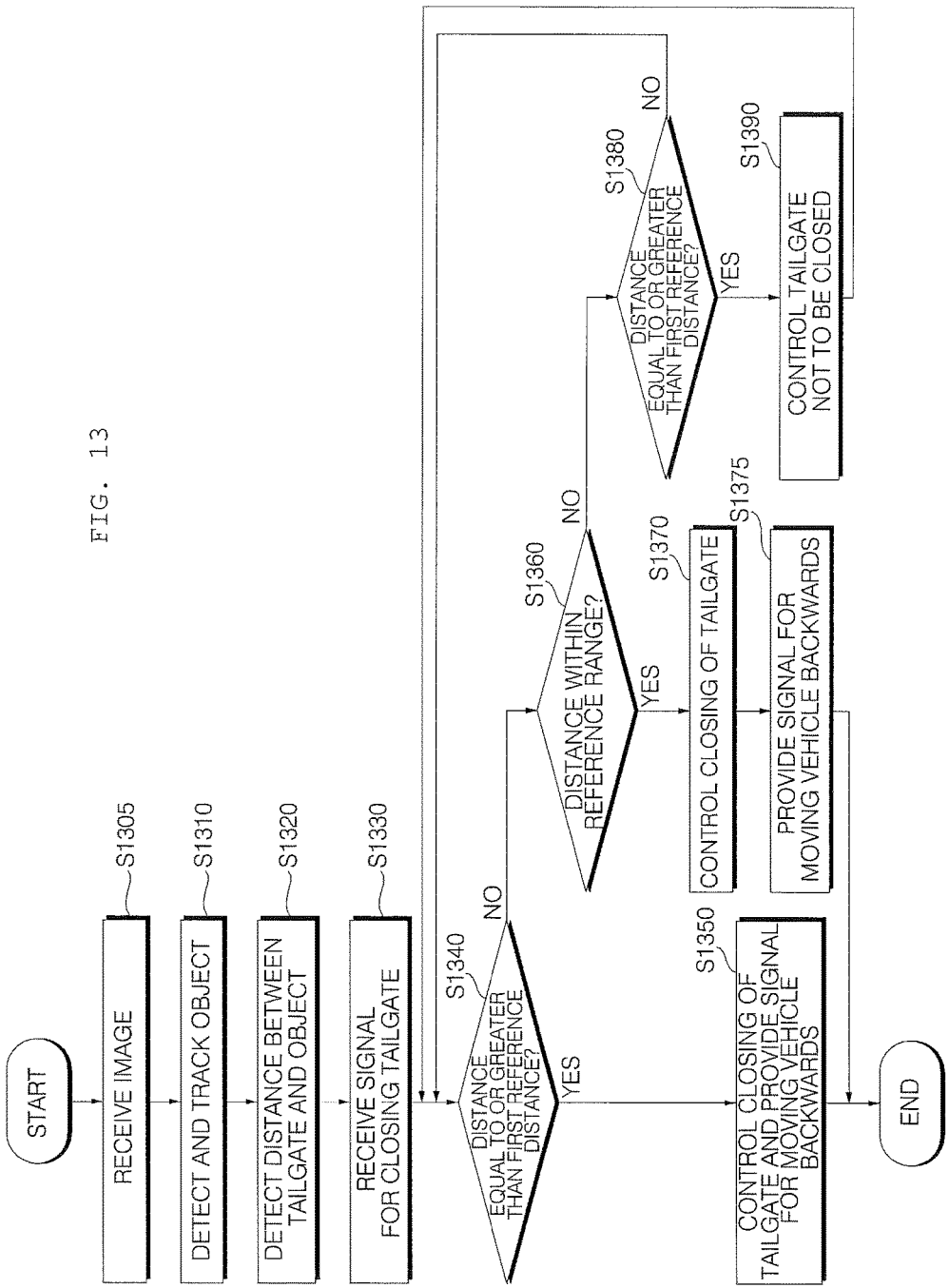
FIG. 13 is a flowchart illustrating an example operation of a vehicle door control apparatus.

FIG. 13 is a flowchart referenced to explain operation of a vehicle door control apparatus according to the implementation, and FIGS. 14A to 14D are views referenced to explain operation of FIG. 13 according to an implementation.

Operation of the vehicle door control apparatus 200 described with reference to FIGS. 13 to 14D may be performed after the vehicle moves forward and the tailgate is opened in operation of the vehicle door control apparatus 200 described with reference to FIGS. 9 to 100.

Referring to the figures, the processor 270 may receive an image from the camera of the sensing unit 225 (S1305).

The camera may be provided in one area of the tailgate 20. The camera may acquire the image of the outside of the tailgate. The processor 270 may receive the image of the outside of the tailgate. The image of the outside of the tailgate may be a rear image of the vehicle 100 in a state of closing the tailgate.

Figure 14A:
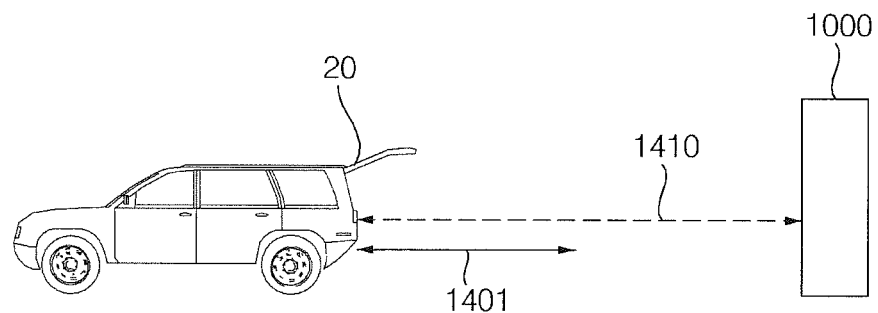
FIGS. 14A to 14D are diagrams illustrating examples of operation of a vehicle door control apparatus, such as that shown in FIG. 13.

As shown in FIG. 14A, the processor 270 may detect the object 1000 from the received image and track the detected object 1000 (S1310). The processor 270 may detect a distance 1410 between the tailgate 20 and the object 1000.

For example, the processor 270 may detect the distance between the tailgate 20 and the object 1000 using a pinhole, a motion vector, disparity or size change of the object.

For example, when the vehicle 100 moves, the object 1000 detected from the received image may appear to move. At this time, the processor 270 may detect the distance 1410 between the tailgate 20 and the object 1000 based on change in motion of the object 1000 or change in size of the object 1000.

For example, when the vehicle 100 moves, the processor 270 may detect the distance 1410 between the tailgate 20 and the object 1000 based on disparity detected by tracking the object 1000 in an image of a first frame and an image of a second frame received from the camera.

The processor 270 may receive a signal for closing the tailgate 20 through the input unit 220 (S1330).

Figure 14B:
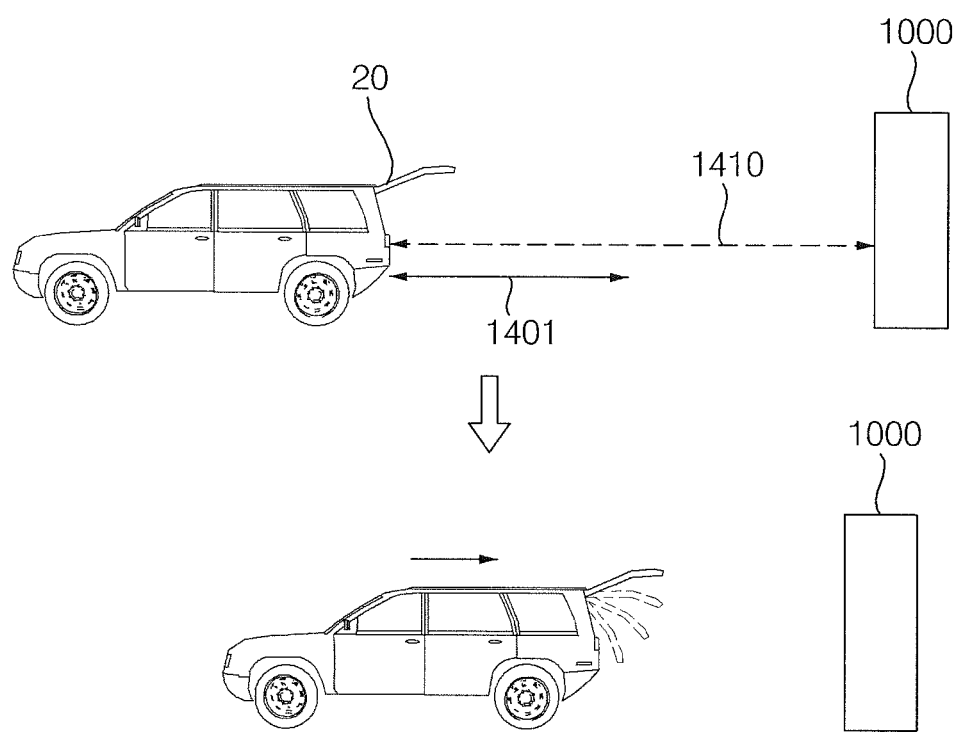

As shown in FIG. 14B, the processor 270 may determine whether the detected distance 1410 is equal to or greater than a first reference distance 1401 (S1340).

If the detected distance 1410 is equal to or greater than the first reference distance 1401, the processor 270 may control closing of the tailgate 20. In addition, the processor 270 may provide a signal for moving the vehicle backwards (S1350). At this time, the processor 270 may provide a control signal for moving the vehicle 100 backwards while closing the tailgate 20. Meanwhile, the processor 270 may provide the signal for moving the vehicle 100 backwards to the power source drive unit 151 through the interface 230.

Figure 14C:
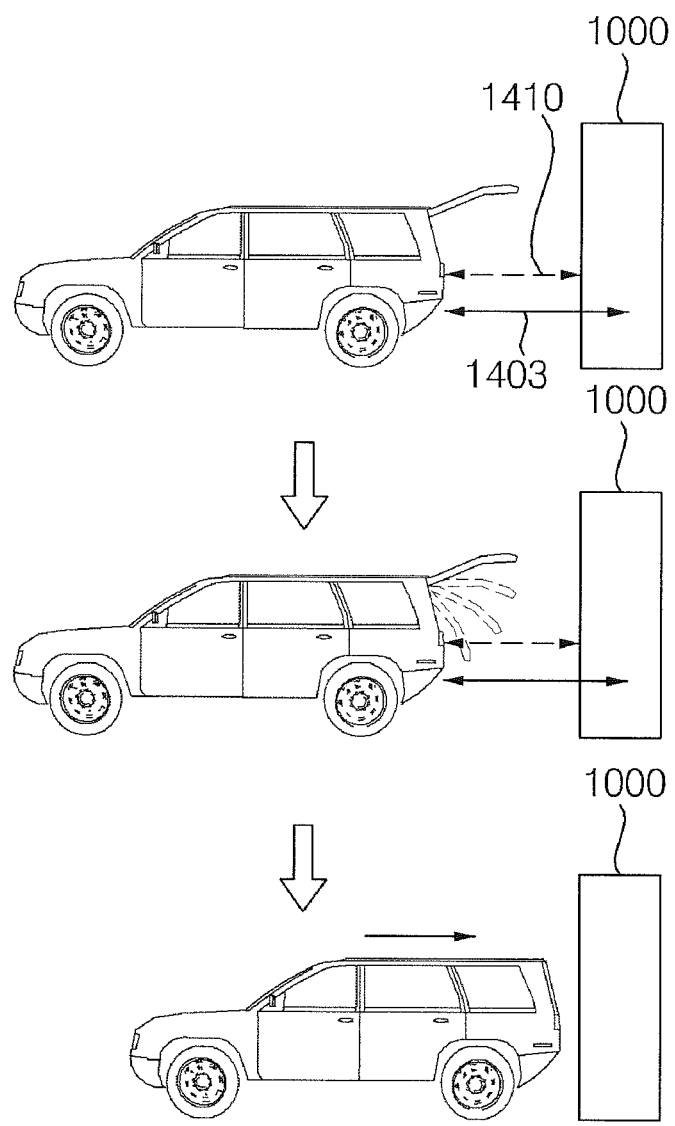

As shown in FIG. 14C, the processor 270 may determine whether the detected distance 1410 is within a reference range 1403 (S1360).

If the detected distance 1410 is within the reference range 1403, the processor 270 may control closing of the tailgate (S1370).

Thereafter, after the tailgate 20 is completely closed, the processor 270 may provide a signal for moving the vehicle 100 backwards (S1375). Meanwhile, the processor 270 may provide the signal for moving the vehicle 100 backwards to the power source drive unit 151 through the interface 230.

Figure 14D:
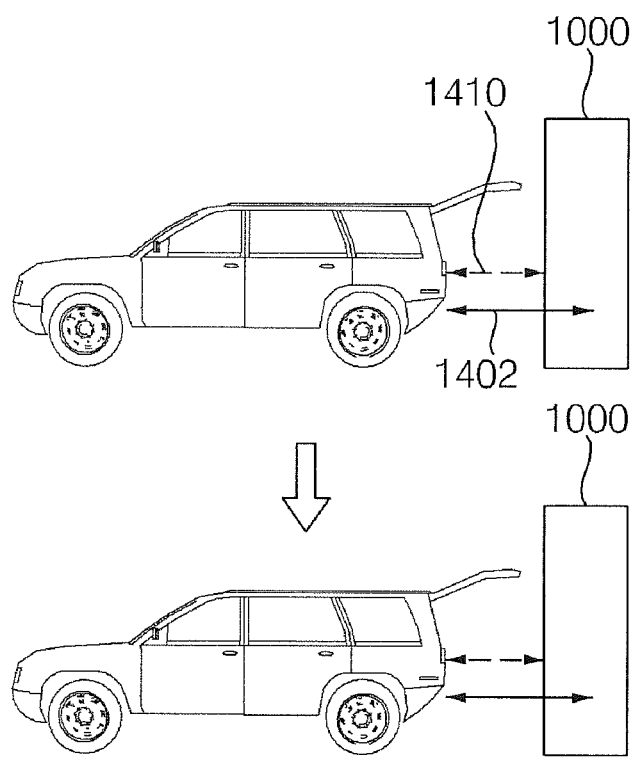

As shown in FIG. 14D, the processor 270 may determine whether the detected distance 1410 is equal to or less than a second reference distance 1402 (S1380).

If the detected distance 1410 is equal to or less than the second reference distance 1402, the processor 270 may control the tailgate 20 not to be closed (S1390).

FIG. 15 is a view referenced to explain operation of a vehicle display apparatus based on object information received in a vehicle door control apparatus according to an implementation.

Referring to FIG. 15, the processor 270 may provide data to the vehicle display apparatus 160 through the interface 230. Here, the data may be data related to information on a stop area in which the door may be opened or closed based on object information.

The AVM apparatus may provide an image of the vicinity of the vehicle. The image of the vicinity of the vehicle may be a top-view image.

The vehicle display apparatus 160 may display an image corresponding to data received from the processor 270 on the top-view image provided via the AVM apparatus.

The vehicle display apparatus 160 may display an object image 1520 corresponding to an object. The vehicle display apparatus 160 may display a stop area image 1530 corresponding to a stop area separated from the object by a predetermined distance or more. Here, the stop area may be an area where the tailgate does not come into contact with the object upon opening of the tailgate in a state of stopping the vehicle 100.

For example, the stop area image 1530 may be a top-view image, a box image including predetermined colors or a parking line image.

Figure 16:
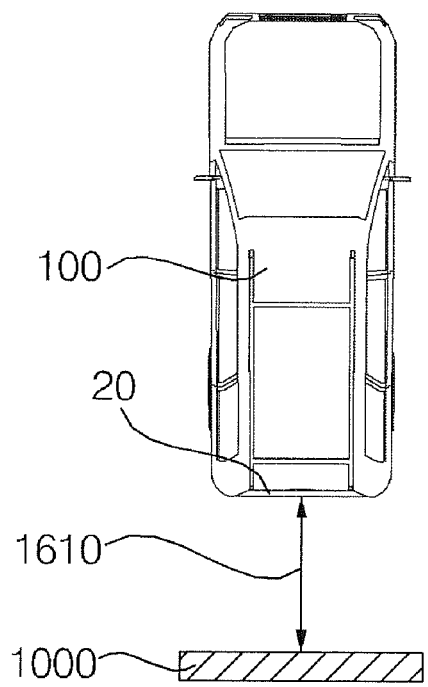
FIG. 16 is a diagram illustrating an example operation of a vehicle that stops in a stop area where a door may be opened or closed based on object information.

FIG. 16 is a view referenced to explain operation of a vehicle which stops in a stop area where a door may be opened or closed based on object information according to an implementation.

Referring to FIG. 16, in a process of parking the vehicle 100, the processor 280 of the vehicle door control apparatus 200 may provide a signal to the brake drive unit 153 such that the vehicle stops in the stop area in which the door may be opened or closed based on the object information.

Here, the stop area may be an area in which the distance between 1610 between the object 1000 and the tailgate 20 is within the reference range upon moving the vehicle 100 backwards. The stop area may be an area in which contact with the object does not occur upon opening of the tailgate 20. The stop area may be an area where a person may take an object out of the vehicle 100 at the back side of the vehicle 100, upon opening the tailgate 20.

Implementations described herein may have one or more of the following effects.

First, by providing a signal for opening or closing of the vehicle door based on object information, it is possible to prevent collision between the vehicle door and an object located around the vehicle.

Second, if the door is a tailgate, the sensor is concealed by the emblem and, if necessary, is exposed to protect the sensor.

Third, since a sensor included in an apparatus provided in a conventional vehicle may be used, manufacturing cost is not increased.

Fourth, since opening or closing of the door and the movement of the vehicle are simultaneously controlled based on the distance from the object, it is possible to increase user convenience.

The foregoing implementations may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). The computer may include the processor 270 or the controller 170. The above exemplary implementations are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A vehicle door control apparatus comprising:
    a sensor provided on a door of a vehicle;
    an interface configured to communicate with a power source drive unit that is configured to control a power source provided in the vehicle; and
    a processor configured to control opening or closing of the door based on information regarding an object sensed through the sensor,
    wherein the door is a tailgate, and
    the processor is further configured to:
        based on the object sensed by the sensor being located within an opening trajectory of the tailgate, provide a signal, to the power source drive unit, for moving the vehicle in a forward direction.

2. The vehicle door control apparatus according to claim 1, wherein:
    the door is a tailgate,
    the sensor is covered by an emblem formed in one area of the tailgate, and
    the processor is configured to control motion of the emblem such that, based on an occurrence of a first event, the processor controls a movement of the emblem to expose the sensor.

3. The vehicle door control apparatus according to claim 2, wherein:
    the emblem is configured to rotate about a horizontal axis or a vertical axis, and
    the processor is configured to control a rotation of the emblem about the horizontal axis or about the vertical axis based on the occurrence of the first event.

4. The vehicle door control apparatus according to claim 3, wherein the first event is an input signal reception event for opening the door that is received through an input unit that is provided near the emblem.

5. The vehicle door control apparatus according to claim 1, wherein the sensor is an ultrasonic sensor or a camera.

6. The vehicle door control apparatus according to claim 5, wherein the camera comprises an around view monitoring (AVM) apparatus, a blind spot detection (BSD) apparatus, or a rear camera apparatus provided in the vehicle.

7. The vehicle door control apparatus according to claim 1, wherein the processor is configured to:
    detect a distance between the door and the object; and
    control opening or closing of the door based on the distance detected between the door and the object.

8. The vehicle door control apparatus according to claim 7, wherein the processor is configured to:
    based on the distance between the door and the object being within a threshold distance, control opening of the door such that the door and the object do not come into contact.

9. The vehicle door control apparatus according to claim 7, wherein the processor is configured to:
    based on the distance between the door and the object being within a threshold distance, provide a signal for controlling the door not to be opened despite an occurrence of a first event.

10. The vehicle door control apparatus according to claim 1, wherein the processor is configured to:
    based on the door being opened, stop the opening of the door based on the object sensed through the sensor being located within an opening trajectory of the door.

11. The vehicle door control apparatus according to claim 10, wherein:
    the sensor is configured to sense objects within a sensing range, and
    the sensing range of the sensor is adapted in correspondence with a motion of the door of the vehicle.

12. The vehicle door control apparatus according to claim 1, wherein the processor is configured to provide the signal to the power source drive unit for moving the vehicle in the forward direction by a distance such that the object sensed by the sensor is outside of the opening trajectory of the tailgate.

13. The vehicle door control apparatus according to claim 12, wherein the processor is further configured to control an opening of the tailgate while the vehicle moves in the forward direction.

14. The vehicle door control apparatus according to claim 13, wherein the processor is further configured to:
    based on a second event occurring in a state of opening the tailgate, control closing of the tailgate, and
    provide a signal for moving the vehicle in a backwards direction such that a backward movement of the vehicle is in correspondence with a closing speed of the tailgate.

15. The vehicle door control apparatus according to claim 14, wherein the processor is further configured to:
    based on receiving, through the interface, information regarding a rear object located behind the vehicle, control the tailgate to close with a first closing speed that is greater than a second closing speed with which the tailgate is closed based on the information regarding the rear object not being received.

16. The vehicle door control apparatus according to claim 14, wherein:
    the interface is configured to communicate with a brake drive unit for controlling a brake apparatus provided in the vehicle, and
    the processor is configured to:

detect a distance between the vehicle and the object; and provide a signal, to the brake drive unit, for stopping the vehicle based on the distance being within a threshold distance.

17. The vehicle door control apparatus according to claim 12, wherein:
the interface is configured to communicate with a brake drive unit that is configured to control a brake apparatus provided in the vehicle, and
the processor is further configured to:
receive, through the interface, information regarding a forward object located in front of the vehicle, and
provide a signal, to the brake drive unit, for stopping the vehicle based on the forward object being located on a movement route of the vehicle moving in the forward direction.

18. The vehicle door control apparatus according to claim 1, wherein the processor is configured to, based on closing the door, stop the closing of the door based on the object being located within a closing trajectory of the door.

19. The vehicle door control apparatus according to claim 18, wherein:
the door is a tailgate,
the sensor is rotatably formed, and
the processor is configured to control a rotation of the sensor based on an occurrence of an event.

20. The vehicle door control apparatus according to claim 1, further comprising an interface configured to communicate with a vehicle display apparatus,
wherein the processor is configured to provide data to display, on the vehicle display apparatus, a stop area in which the door is able to be opened or closed based on the information regarding the object.

21. The vehicle door control apparatus according to claim 1, further comprising an interface configured to communicate with a brake drive unit that is configured to control a brake apparatus provided in the vehicle,
wherein the processor is configured to provide a signal to the brake drive unit to stop the vehicle in a stop area in which the door is able to be opened or closed based on the information regarding the object.

22. The vehicle door control apparatus according to claim 1, wherein:
the door is a side door, and
the processor is configured to control opening of the door within a range in which the side door and the object do not come into contact.

23. A vehicle comprising:
a power source provided in the vehicle;
a power source drive unit configured to control the power source; and
a vehicle door control apparatus comprising:
a sensor provided on a door of a vehicle,
an interface configured to communicate with the power source drive unit, and
a processor configured to control opening or closing of the door based on information regarding an object sensed through the sensor,
wherein the door is a tailgate, and
the processor is further configured to:
based on the object sensed by the sensor being located within an opening trajectory of the tailgate, provide a signal, to the power source drive unit, for moving the vehicle in a forward direction.

* * * * *